US011315320B2

(12) United States Patent
Kuma et al.

(10) Patent No.: US 11,315,320 B2
(45) Date of Patent: Apr. 26, 2022

(54) INFORMATION PROCESSING APPARATUS AND METHOD

(71) Applicant: SONY CORPORATION, Tokyo (JP)

(72) Inventors: Satoru Kuma, Tokyo (JP); Tsuyoshi Kato, Kanagawa (JP); Ohji Nakagami, Tokyo (JP); Koji Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 48 days.

(21) Appl. No.: 16/649,295

(22) PCT Filed: Sep. 14, 2018

(86) PCT No.: PCT/JP2018/034131
§ 371 (c)(1),
(2) Date: Mar. 20, 2020

(87) PCT Pub. No.: WO2019/065299
PCT Pub. Date: Apr. 4, 2019

(65) Prior Publication Data
US 2020/0279435 A1 Sep. 3, 2020

(30) Foreign Application Priority Data
Sep. 29, 2017 (JP) .............................. JP2017-189782

(51) Int. Cl.
*G06T 17/10* (2006.01)
(52) U.S. Cl.
CPC .......... *G06T 17/10* (2013.01); *G06T 2210/56* (2013.01)
(58) Field of Classification Search
None
See application file for complete search history.

(56) References Cited

U.S. PATENT DOCUMENTS 6,867,774 B1 3/2005 Halmshaw et al.
2017/0214943 A1* 7/2017 Cohen .................... H04N 19/91
(Continued)

FOREIGN PATENT DOCUMENTS

JP 2012-230294 A 11/2012
JP 2016-224674 A 12/2016

OTHER PUBLICATIONS

Ohji Nakagami et al., Point cloud compression technology proposal by Sony, International Organisation for Standardisation, ISO/IEC JTC1/SC29/WG11, Coding of Moving Pictures and Audio, Oct. 2017, pp. 1-43, Macau, CN.
(Continued)

*Primary Examiner* — Yanna Wu
(74) *Attorney, Agent, or Firm* — Paratus Law Group, PLLC

(57) ABSTRACT

There is provided an information processing apparatus and method that makes it possible to suppress a reduction in a subjective image quality. Point cloud data before update of position information is searched for a point to be compared, the point to be compared being a point to be compared with a current point, the current point being a processing target point of the point cloud data with the updated position information, and the retrieved point to be compared is compared with the current point, and attribute information of the current point is set. The present disclosure is applicable to, for example, an information processing apparatus, an image processing apparatus, electronic equipment, an information processing method, a program, etc.

22 Claims, 30 Drawing Sheets

(56) References Cited

U.S. PATENT DOCUMENTS

2018/0310025 A1\* 10/2018 Keranen ............... G06T 17/005
2019/0311502 A1\* 10/2019 Mammou ............... G01S 17/89
2021/0105494 A1\* 4/2021 Sugio .................... H04N 19/91

OTHER PUBLICATIONS

Robert A. Cohen et al., Point Cloud Attribute Compression Using 3-D Intra Prediction and Shape-Adaptive Transforms, 2016 Data Compression Conference (DCC), Mar. 30-Apr. 1, 2016, pp. 141-150, IEEE, Snowbird, UT, USA.

Mekuria et al., Design, Implementation and Evaluation of a Point Cloud Codec for Tele-Immersive Video, IEEE Transactions on Circuits and Systems for Video Technology, Mar. 16, 2016, pp. 1-14, vol. 27, Issue 4, IEEE.

\* cited by examiner

FIG. 11

| IN CASE WHERE POSITION OF POINT IS SHIFTED, OR NUMBER OF POINTS IS DECREASED |||||
|---|---|---|---|---|
| USE APPLICATION | COMPARISON METHOD | WAY TO DETERMINE OBJECT TO BE COMPARED | WAY TO DETERMINE COLOR | EXCEPTION PROCESSING |
| HIGH SPEED | B to A | NEAREST POINT | ONE COLOR | N/A |
| HIGH QUALITY (EMPHASIS ON OBJECTIVE INDICATOR) | A to B, B to A | NEAREST POINT | AVERAGE COLOR | N/A |
| HIGH QUALITY (EMPHASIS ON SUBJECTIVE INDICATOR) | A to B, B to A | NEAREST POINT | WEIGHTED AVERAGE COLOR | N/A |

A

| IN CASE WHERE NUMBER OF POINTS IS INCREASED (FOR EXAMPLE, IN CASE OF COMPRESSION USING AUTO-CORRELATION, AND IN CASE OF MODELLING BASED ON GAUSSIAN DISTRIBUTION AND RESAMPLING) |||||
|---|---|---|---|---|
| USE APPLICATION | COMPARISON METHOD | WAY TO DETERMINE OBJECT TO BE COMPARED | WAY TO DETERMINE COLOR | EXCEPTION PROCESSING |
| HIGH SPEED | B to A | NEAREST POINT LOCATED AT DISTANCE SHORTER THAN DISTANCE r | ONE COLOR | INVISIBLE/ EXCLUSION/ MODE CHANGE |
| HIGH QUALITY (EMPHASIS ON OBJECTIVE INDICATOR) | A to B, B to A | NEAREST POINT LOCATED AT DISTANCE SHORTER THAN DISTANCE r | AVERAGE COLOR | INVISIBLE/ EXCLUSION/ MODE CHANGE |
| HIGH QUALITY (EMPHASIS ON SUBJECTIVE INDICATOR) | A to B, B to A | NEAREST POINT LOCATED AT DISTANCE SHORTER THAN DISTANCE r | WEIGHTED AVERAGE COLOR | INVISIBLE/ EXCLUSION/ MODE CHANGE |

B

INFORMATION PROCESSING APPARATUS AND METHOD

CROSS REFERENCE TO PRIOR APPLICATION

This application is a National Stage Patent Application of PCT International Patent Application No. PCT/JP2018/034131 (filed on Sep. 14, 2018) under 35 U.S.C. § 371, which claims priority to Japanese Patent Application No. 2017-189782 (filed on Sep. 29, 2017), which are all hereby incorporated by reference in their entirety.

TECHNICAL FIELD

The present disclosure relates to an information processing apparatus and method, and, particularly, to an information processing apparatus and method that makes it possible to suppress a reduction in a subjective image quality.

BACKGROUND ART

There has been quantization using voxels, for example, such as an octree, as a compression method of a point cloud that represents a three-dimensional structure with position information, attribute information, etc. of a point group, or vertex data of meshes that are composed of vertices, edges, and faces and define a three-dimensional shape by means of polygonal representation (see, for example, NPTL 1).

CITATION LIST

Non Patent Literature

NPTL 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf

SUMMARY OF THE INVENTION

However, in general, such quantization of position information is likely to cause distortion in geometry information and to shift the position of a point. Therefore, a positional relationship of attribute information, such as color information, is also distorted, and a point to be compared is changed, or the number of points to be compared is increased or decreased, and thus there is a possibility that the peak signal-to-noise ratio (PSNR) may be reduced. That is, there is a possibility that the subjective image quality of a point cloud may be reduced.

The present disclosure has been made in view of such circumstances, and makes it possible to suppress the reduction in the subjective image quality.

An information processing apparatus according to an aspect of the present technology is an information processing apparatus including: a search section that searches point cloud data before update of position information for a point to be compared, the point to be compared being a point to be compared with a current point, the current point being a processing target point of the point cloud data with the updated position information; and an attribute information setting section that compares the point to be compared retrieved by the search section with the current point, and sets attribute information of the current point.

An information processing method according to an aspect of the present technology is an information processing method including: searching point cloud data before update of position information for a point to be compared, the point to be compared being a point to be compared with a current point, the current point being a processing target point of the point cloud data with the updated position information; and comparing the retrieved point to be compared with the current point and setting attribute information of the current point.

According to an information processing apparatus and method according to an aspect of the present technology, point cloud data before update of position information is searched for a point to be compared that is a point to be compared with a current point that is a processing target point of the point cloud data with the updated position information, and the retrieved point to be compared is compared with the current point, and attribute information of the current point is set.

According to the present disclosure, it is possible to process information. In particular, it is possible to suppress the reduction in the subjective image quality.

BRIEF DESCRIPTION OF DRAWINGS

FIG. 11 is a diagram that describes an example of control of an attribute information determining method.

MODES FOR CARRYING OUT THE INVENTION

Some forms for embodying the present disclosure (hereinafter, referred to as embodiments) are described below. It is to be noted that description is given in the following order.
1. Setting of Single Piece of Attribute Information on Point with Updated Position Information
2. First Embodiment (Encoding Device: Setting of Single Piece of Attribute Information)
3. Second Embodiment (Decoding Device: Setting of Single Piece of Attribute Information)
4. Third Embodiment (Encoding Device: Setting of Multiple Pieces of Attribute Information)
5. Fourth Embodiment (Display Device: Setting of Multiple Pieces of Attribute Information)
6. Fifth Embodiment (Image Processing Apparatus)
7. Others

1. Setting of Single Piece of Attribute Information on Point with Updated Position Information <Point Cloud>

There has been data such as a point cloud that represents a three-dimensional structure with position information, attribute information, etc. of a point group, or meshes that are composed of vertices, edges, and faces and define a three-dimensional shape by means of polygonal representation.

Figure 1:
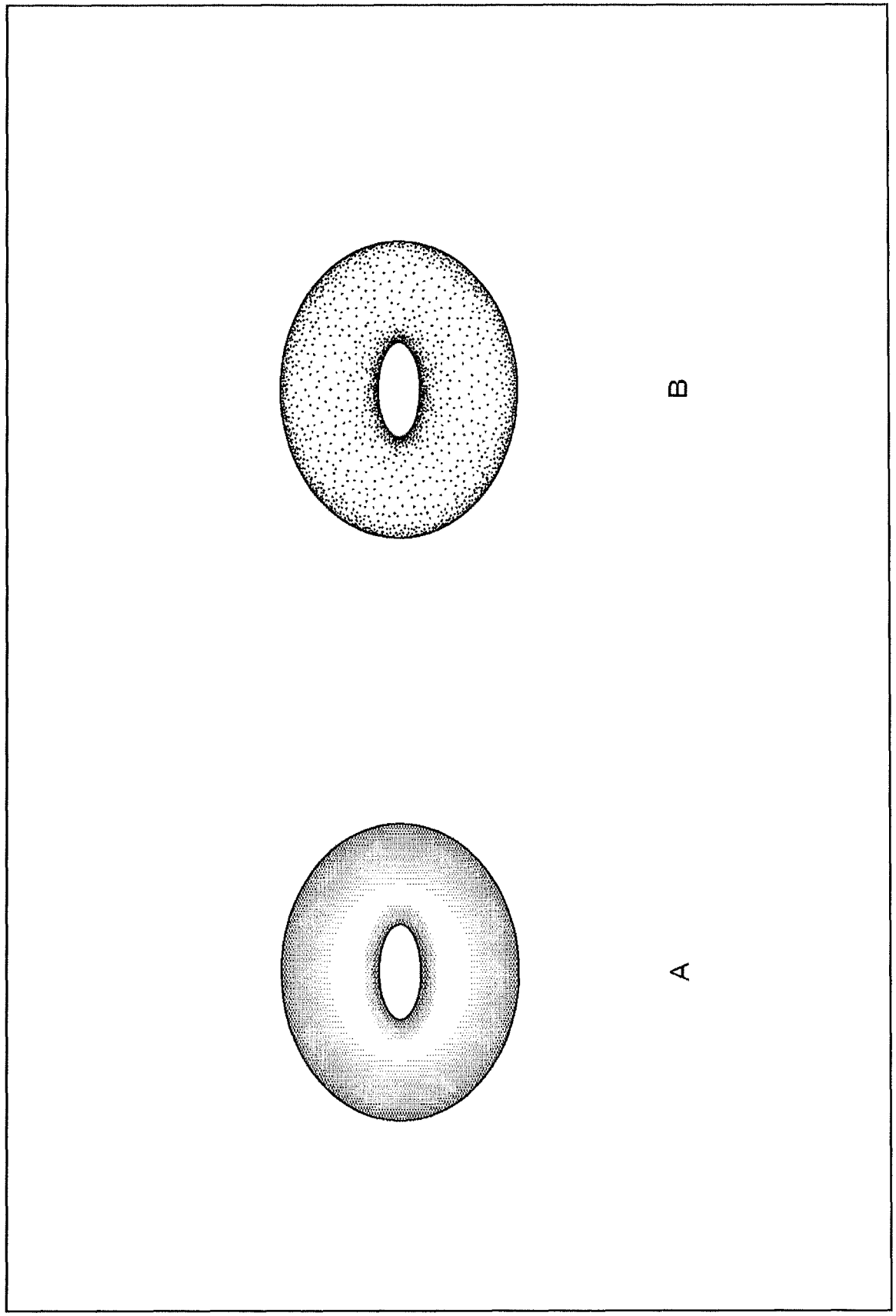
FIG. 1 is a diagram that describes an example of a point cloud.

For example, in a case of a point cloud, a three-dimensional structure illustrated in part A of FIG. 1 is represented as a set (a point group) of many points (point data) illustrated in part B of FIG. 1. That is, data of the point cloud includes respective pieces of position information and attribute information (for example, color, etc.) on the points of this point group. Therefore, it has a relatively simple data structure, and allows any three-dimensional structure to be represented with sufficient precision by using sufficiently many points.

However, data of such a point cloud and meshes or the like is relatively large in data amount; therefore, compression of the data amount by encoding or the like is required. For example, an encoding method using voxels, such as an octree or a k-d tree, may be implemented. The voxels are a data structure for quantizing position information of an object to be encoded.

<Setting of Attribute Information in Quantization of Position Information>

In general, such quantization of position information is likely to cause distortion in geometry information and to shift the position of a point. On each point, attribute information is also set together with position information (geometry information). Therefore, due to such quantization, a positional relationship of the attribute information, such as color information, is also distorted, and a point to be compared is changed, or the number of points to be compared is increased or decreased, and thus there is a possibility that the peak signal-to-noise ratio (PSNR) may be reduced. That is, there is a possibility that the subjective image quality of a point cloud may be reduced.

Accordingly, it is configured to search point cloud data before the update of position information for a point to be compared that is a point to be compared with a current point, which is a processing target point of the point cloud data with the updated position information, and compare the point to be compared identified by the search with the current point and set attribute information of the current point.

For example, an information processing apparatus includes: a search section that searches point cloud data before update of position information for a point to be compared, the point to be compared being a point to be compared with a current point, the current point being a processing target point of the point cloud data with the updated position information; and an attribute information setting section that compares the point to be compared retrieved by the search section with the current point, and sets attribute information of the current point.

In this way, by identifying a point to be compared in consideration of the change in position information and using attribute information of the point to be compared to set attribute information of a current point that is a processing target, it becomes possible to suppress the change in attribute information (color information, etc.) with the change in the position information. Therefore, it is possible to suppress the reduction in the PSNR and suppress the reduction in the subjective image quality (the change in appearance) of the point cloud.

<Outline of Setting>

Figure 2:
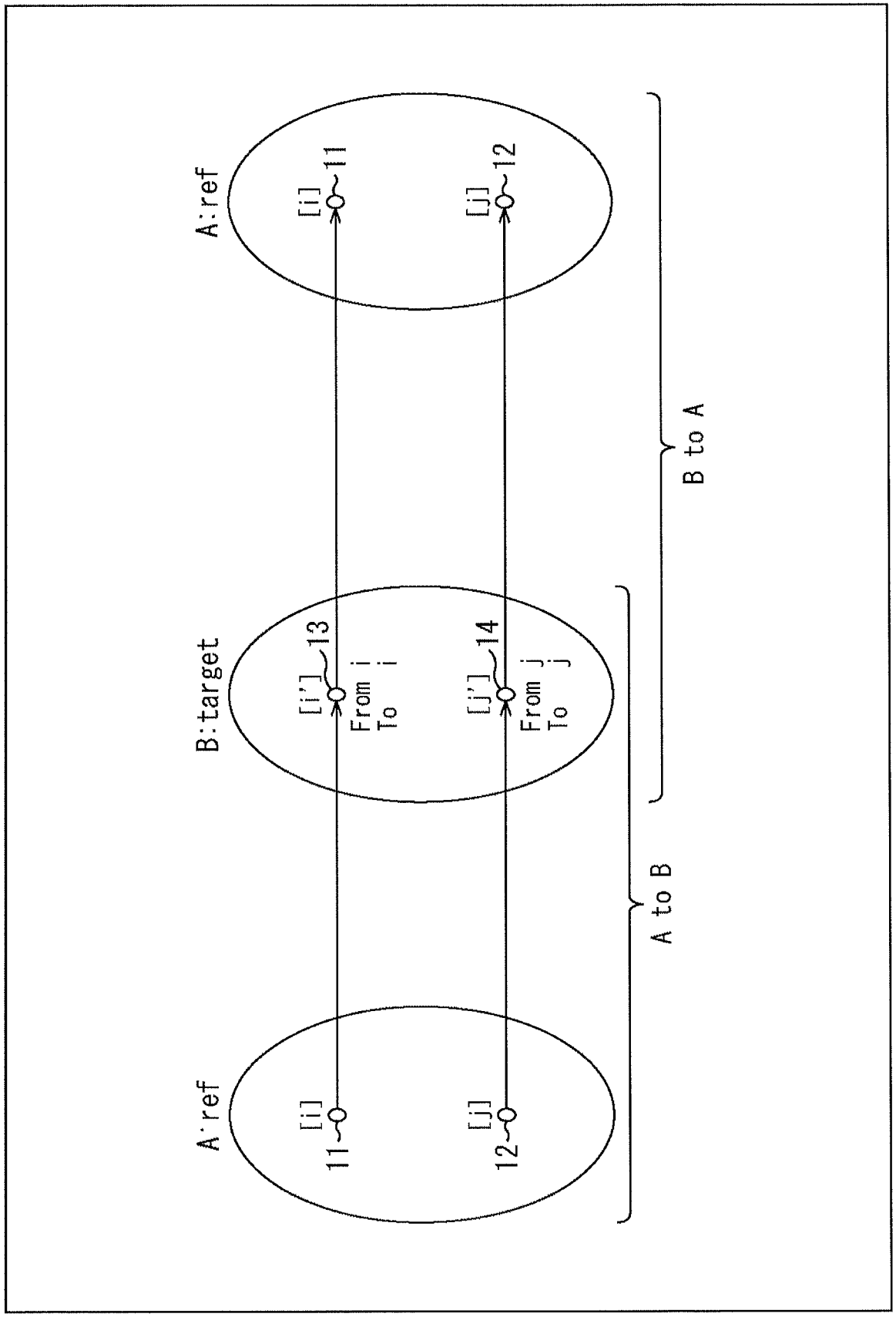
FIG. 2 is a diagram that describes an example of changes in points due to quantization, etc.
Figure 3:
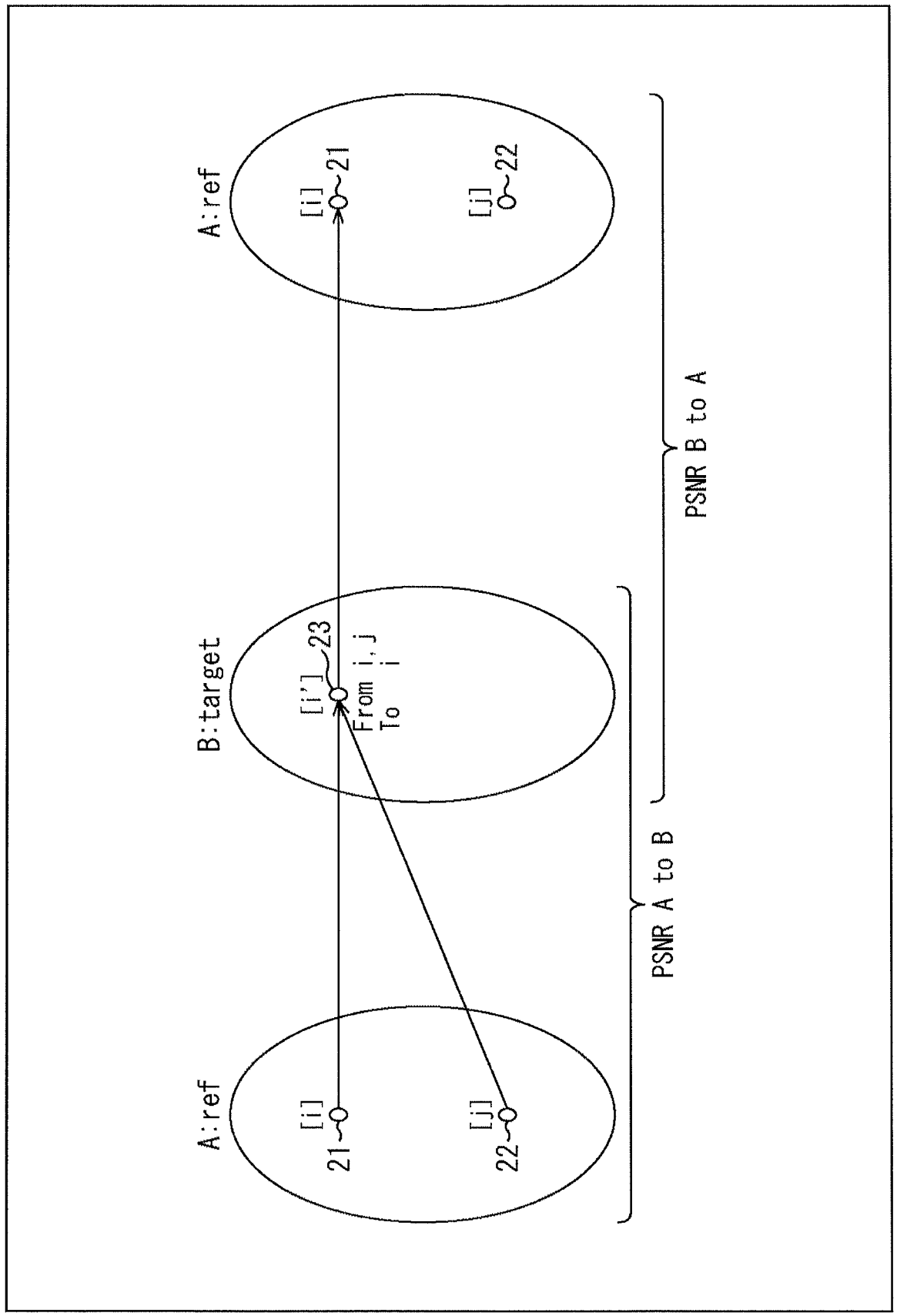
FIG. 3 is a diagram that describes an example of changes in points due to quantization, etc.
Figure 4:
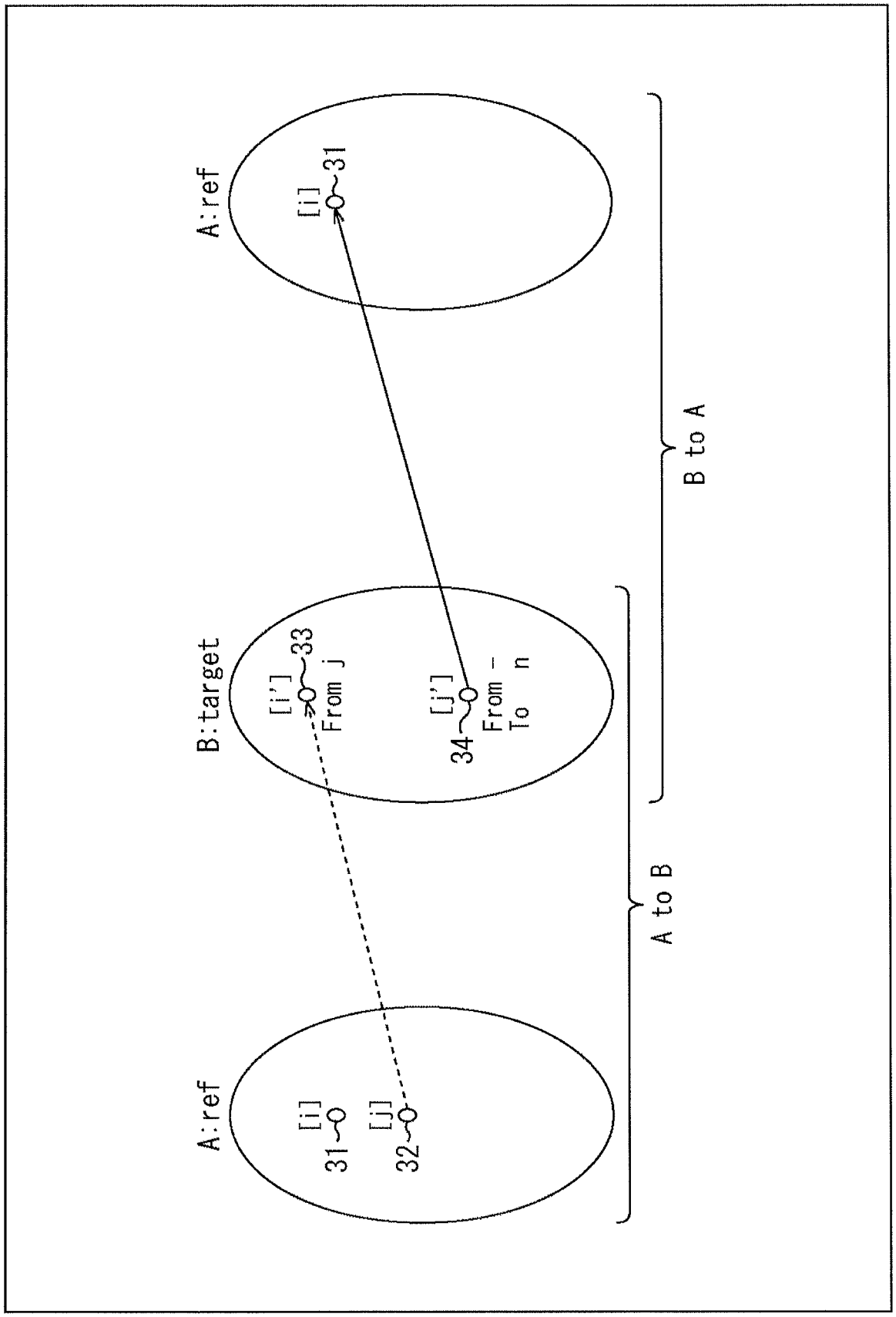
FIG. 4 is a diagram that describes an example of changes in points due to quantization, etc.

An outline of such setting is described with reference to FIGS. 2 to 4. FIGS. 2 to 4 each illustrate how points are changed by quantization of position information. Parts A of these drawings each schematically illustrate a point cloud before the quantization. Furthermore, parts B of these drawings schematically illustrate the point cloud after the quantization. Each arrow in AtoB indicates a correspondence relationship between a point before the quantization and the point after the quantization in a case where after the quantization is taken as a reference; each arrow in BtoA indicates a correspondence relationship between a point before the quantization and the point after the quantization in the reverse case, i.e., in a case where before the quantization is taken as a reference.

For example, FIG. 2 illustrates an example of a case where the positions and the number of points remain substantially unchanged by the quantization. In this case, in AtoB, an object to be compared with a point 13 after the quantization is a point 11 before the quantization located in about the same position as the point 13 (the point 13 after the quantization corresponds to the point 11 before the quantization). Furthermore, in BtoA, an object to be compared with the point 11 before the quantization is the point 13 after the quantization located in about the same position as the point 11 (the point 11 before the quantization corresponds to the point 13 after the quantization).

Likewise, in AtoB, an object to be compared with a point 14 after the quantization is a point 12 before the quantization located in about the same position as the point 14; in BtoA, an object to be compared with the point 12 before the quantization is the point 14 after the quantization located in about the same position as the point 12.

That is, in this case, on both directions AtoB and BtoA, the correspondence relationship between points is unchanged. Therefore, about the same value as attribute information (i) of the point 11 is set on attribute information (i') of the point 13. Likewise, about the same value as attribute information (j) of the point 12 is set on attribute information (j') of the point 14.

For example, FIG. 3 illustrates an example of a case where the number of points is decreased by the quantization. In this case, in AtoB, an object to be compared with a point 23 after the quantization is points 21 and 22 before the quantization (the point 23 after the quantization corresponds to the points 21 and 22 before the quantization). Furthermore, in BtoA, an object to be compared with the point 21 before the quantization is the point 23 after the quantization located in about the same position as the point 21 (the point 21 before the quantization corresponds to the point 23 after the quantization).

Therefore, a value generated by using attribute information (i) of the point 21 and attribute information (j) of the point 22 or about the same value as the attribute information (i) of the point 21 is set on attribute information (i') of the point 23.

For example, FIG. 4 illustrates an example of a case where the number of points is increased or the position of a point is shifted due to the quantization. In this case, in AtoB, an object to be compared with a point 33 after the quantization is a point 32 before the quantization (the point 33 after the quantization corresponds to the point 32 before the quantization). Furthermore, in BtoA, an object to be compared with a point 31 before the quantization is a point 34 after the quantization (the point 31 before the quantization corresponds to the point 34 after the quantization).

Therefore, about the same value as the attribute information (j) of the point 32 is set on attribute information (i') of the point 33. Furthermore, about the same value as attribute information (i) of the point 31 is set on attribute information (j') of the point 34.

By searching an object to be compared in consideration of the change in position in this way, it becomes possible to set attribute information on each point to cause the reduction in the subjective image quality of the point cloud to be suppressed.

It is to be noted that in the following, the present technology is described taking a point cloud as an example of data to be processed; however, the present technology is not limited to point clouds, and is applicable to any object to be processed as long as its data represents a three-dimensional structure, for example, like meshes, and allows for setting of attribute information. Furthermore, this object to be processed may be a moving image, or may be a still image.

2. First Embodiment

<Encoding Device>

Figure 5:
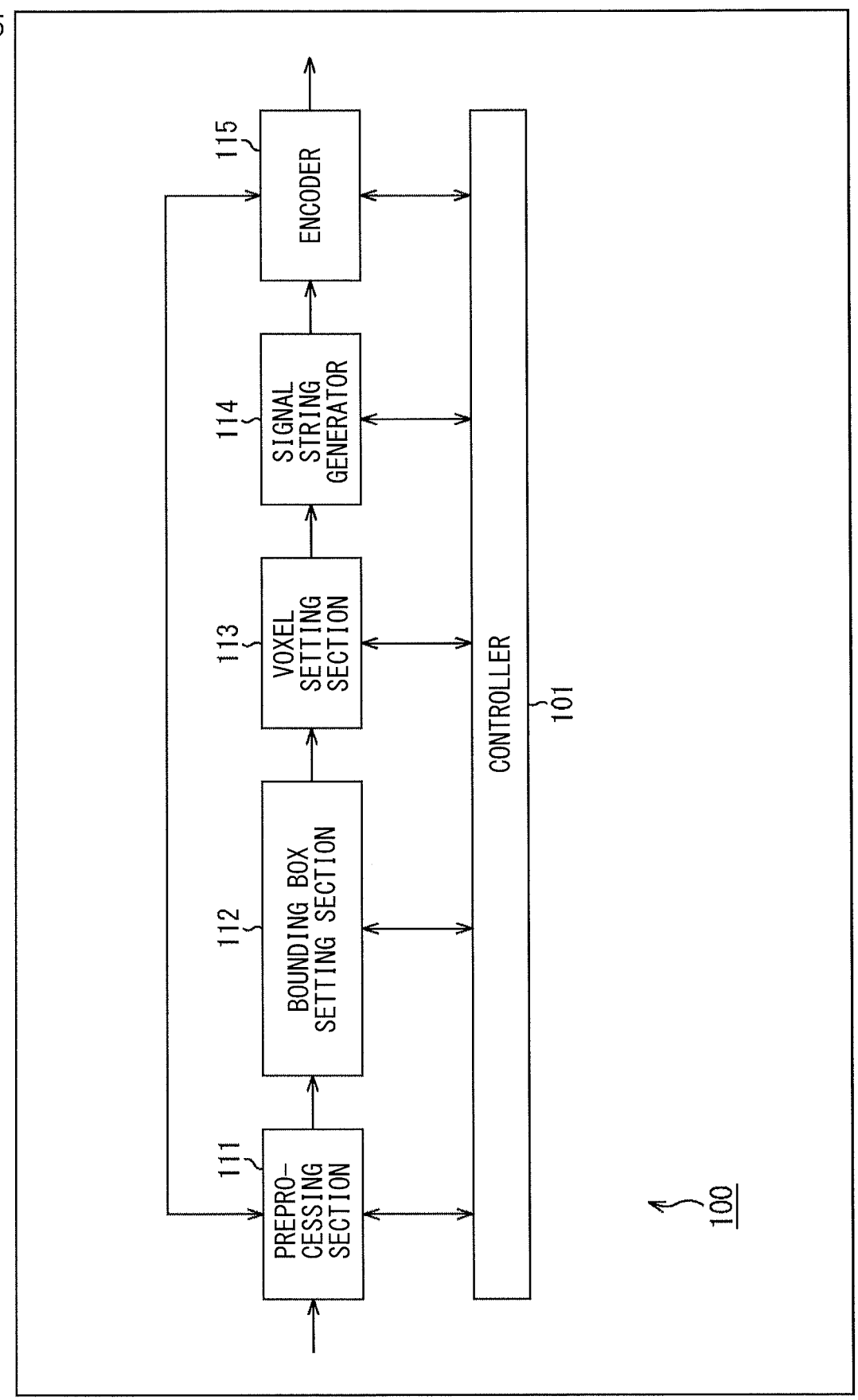
FIG. 5 is a block diagram illustrating an example of a main configuration of an encoding device.

FIG. 5 is a block diagram illustrating an example of a main configuration of an encoding device that is an embodiment of an information processing apparatus to which the present technology is applied. An encoding device 100 illustrated in FIG. 5 encodes data of a point cloud inputted as an object to be encoded by using voxels, and outputs the obtained encoded data, etc. At that time, the encoding device 100 performs this encoding by a method to which the present technology is applied as described below.

As illustrated in FIG. 5, the encoding device 100 includes a controller 101, a preprocessing section 111, a bounding box setting section 112, a voxel setting section 113, a signal stream generator 114, and an encoder 115.

The controller 101 performs processing related to control of each processing section in the encoding device 100. For example, the controller 101 controls the execution or skip (omission) of processing by each processing section. For example, the controller 101 performs such control on the basis of predetermined control information. By doing so, the controller 101 is able to suppress the execution of unnecessary processing and thus suppress the increase in load.

The controller 101 may have any configuration; for example, the controller 101 may include a central processing unit (CPU), a read-only memory (ROM), a random access memory (RAM), etc., and the CPU may load a program and data that have been stored in the ROM or the like into the RAM and execute the program, thereby performing processing.

The preprocessing section 111 is controlled by the controller 101, and performs, as preprocessing, predetermined processing on an object to be encoded (data of a point cloud) inputted to the encoding device 100, and supplies the processed data to the bounding box setting section 112.

For example, in accordance with control information that permits or prohibits execution of preprocessing, in a case where the execution of preprocessing is permitted (not prohibited), the controller 101 causes the preprocessing section 111 to perform preprocessing. Furthermore, for example, in accordance with control information that indicates the area of an object to be encoded subject to the permission or prohibition of execution of preprocessing, the controller 101 causes the preprocessing section 111 to perform preprocessing on the object to be encoded that the execution of preprocessing thereon is permitted (not prohibited). Moreover, for example, in accordance with control information that specifies content of processing permitted or prohibited to be executed, the controller 101 causes the preprocessing section 111 to perform the processing permitted (not prohibited) to be executed. By doing so, it becomes possible to suppress the execution of unnecessary preprocessing, and thus it is possible to suppress the increase in load.

It is to be noted that content of preprocessing is optional. For example, the preprocessing section 111 may perform, as preprocessing, processing for reducing noise or processing for changing the resolution (the number of points). Furthermore, for example, the disposition of points may be updated to cause a point group to have a uniform density or to have an intended deviation. Moreover, for example, data that is not a point cloud, such as image information having depth information, may be inputted to the encoding device 100, and, as preprocessing, the preprocessing section 111 may convert the inputted data into data of a point cloud.

The preprocessing section 111 may have any configuration; for example, the preprocessing section 111 may include a CPU, a ROM, a RAM, etc., and the CPU may load a program and data that have been stored in the ROM or the like into the RAM and execute the program, thereby performing preprocessing.

The bounding box setting section 112 is controlled by the controller 101, and performs processing related to setting of a bounding box for normalizing position information of an object to be encoded.

For example, in accordance with control information that permits or prohibits setting of a bounding box, in a case where the setting of a bounding box is permitted (not prohibited), the controller 101 causes the bounding box setting section 112 to set the bounding box. Furthermore, for example, in accordance with control information that indicates the area of an object to be encoded subject to the permission or prohibition of setting of a bounding box, the controller 101 causes the bounding box setting section 112 to set a bounding box on the object to be encoded that the setting of a bounding box thereon is permitted (not prohibited). Moreover, for example, in accordance with control information related to the permission or prohibition of a parameter used for setting of a bounding box, the controller 101 causes the bounding box setting section 112 to set a bounding box using the parameter that use thereof is permitted (not prohibited). By doing so, it becomes possible to suppress the setting of an unnecessary bounding box and the use of an unnecessary parameter, and thus it is possible to suppress the increase in load.

For example, the bounding box setting section 112 sets a bounding box on each object to be encoded. For example, as illustrated in part A of FIG. 6, in a case where objects 131 and 132 are each represented by data of a point cloud, the bounding box setting section 112 sets bounding boxes 141 and 142 to cause the bounding boxes 141 and 142 to include the objects 131 and 132, respectively as illustrated in part B of FIG. 6. To return to FIG. 5, when having set the bounding box, the bounding box setting section 112 supplies information related to the bounding box to the voxel setting section 113.

It is to be noted that the bounding box setting section 112 may have any configuration; for example, the bounding box setting section 112 may include a CPU, a ROM, a RAM, etc., and the CPU may load a program and data that have been stored in the ROM or the like into the RAM and execute the program, thereby performing a process associated with setting of a bounding box.

The voxel setting section 113 is controlled by the controller 101, and performs processing related to setting of voxels for quantizing position information of an object to be encoded.

For example, in accordance with control information that permits or prohibits setting of voxels, in a case where the setting of voxels is permitted (not prohibited), the controller 101 causes the voxel setting section 113 to set the voxels. Furthermore, for example, in accordance with control information that indicates the area of an object to be encoded subject to the permission or prohibition of setting of voxels, the controller 101 causes the voxel setting section 113 to set voxels in the object to be encoded that the setting of voxels therein is permitted (not prohibited). Moreover, for example, in accordance with control information related to the permission or prohibition of a parameter used for setting of voxels, the controller 101 causes the voxel setting section 113 to set voxels using the parameter that use thereof is permitted (not prohibited). By doing so, it becomes possible to suppress the setting of unnecessary voxels and the use of an unnecessary parameter, and thus it is possible to suppress the increase in load.

For example, the voxel setting section 113 sets voxels in a bounding box set by the bounding box setting section 112. For example, the voxel setting section 113 divides the bounding box 141 and sets voxels 151 as illustrated in part C of FIG. 6. That is, the voxel setting section 113 quantizes (i.e., voxelizes) point cloud data in a bounding box by means of voxels. It is to be noted that in a case where there are multiple bounding boxes, the voxel setting section 113 voxelizes point cloud data with respect to each bounding box. That is, in an example of part B of FIG. 6, the voxel setting section 113 performs similar processing on the bounding box 142 as well. When having set voxels in the way described above, the voxel setting section 113 supplies the voxelized point cloud data (also referred to as voxel data) (information related to a data structure for quantization of position information), attribute information, etc. to the signal stream generator 114.

It is to be noted that the voxel setting section 113 may have any configuration; for example, the voxel setting section 113 may include a CPU, a ROM, a RAM, etc., and the CPU may load a program and data that have been stored in the ROM or the like into the RAM and execute the program, thereby performing a process associated with setting of voxels.

The signal stream generator 114 is controlled by the controller 101, and performs processing related to generation of a signal stream.

For example, in accordance with control information that permits or prohibits generation of a signal stream, in a case where the generation of a signal stream is permitted (not prohibited), the controller 101 causes the signal stream generator 114 to generate a signal stream. Furthermore, for example, in accordance with control information that indicates the area of an object to be encoded subject to the permission or prohibition of generation of a signal stream, the controller 101 causes the signal stream generator 114 to generate a signal stream for the object to be encoded that the generation of a signal stream therefor is permitted (not prohibited). By doing so, it becomes possible to suppress the generation of an unnecessary signal stream, and thus it is possible to suppress the increase in load.

Figure 6:
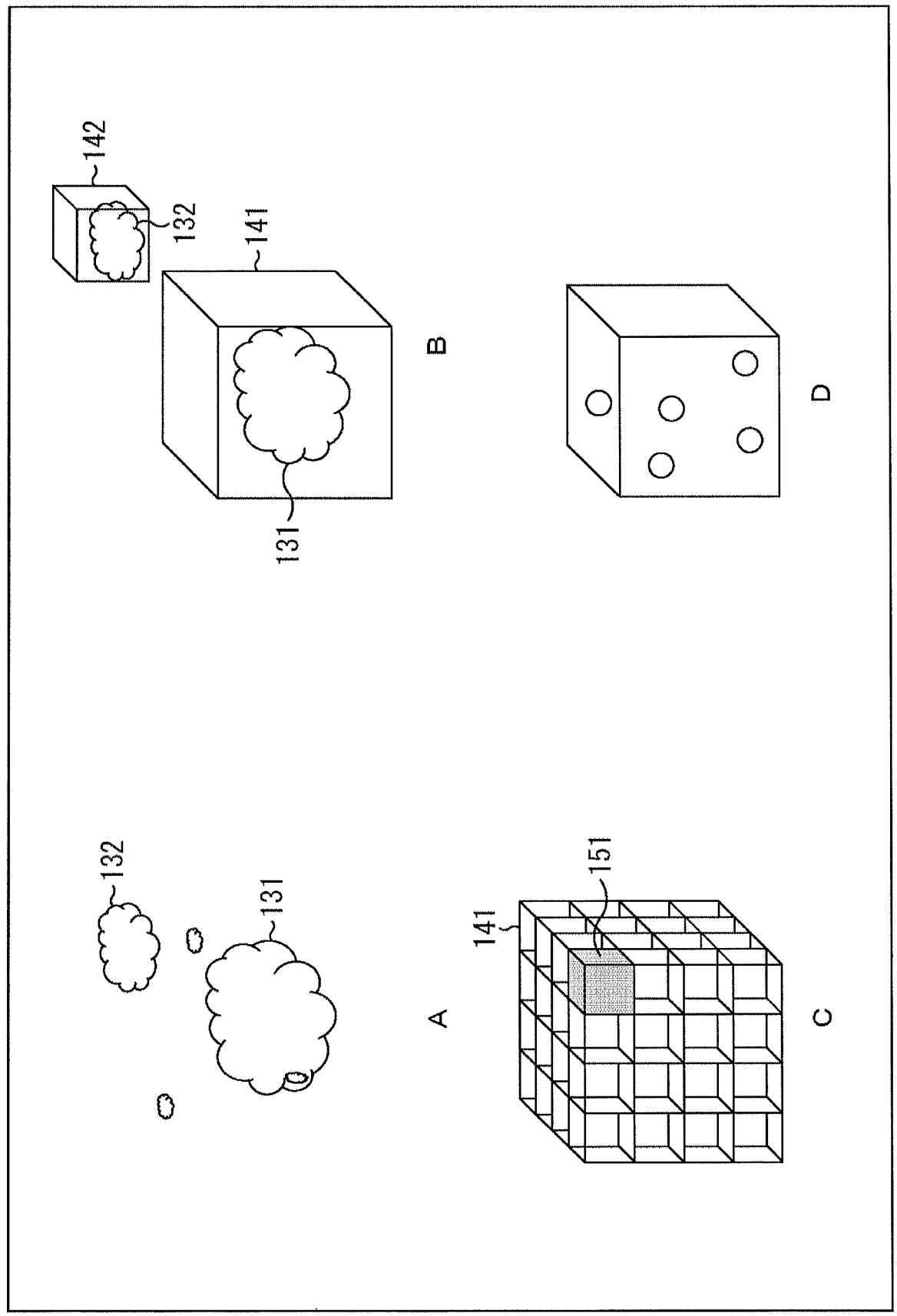
FIG. 6 is a diagram that describes an example of an outline of encoding.

The signal stream generator 114 converts, for example, voxel data that is quantized point cloud data (for example, voxel data generated by the voxel setting section 113 like the one illustrated in part C of FIG. 6) and other information into a signal stream, and supplies the signal stream to the encoder 115.

It is to be noted that the signal stream generator 114 may have any configuration; for example, the signal stream generator 114 may include a CPU, a ROM, a RAM, etc., and the CPU may load a program and data that have been stored in the ROM or the like into the RAM and execute the program, thereby performing a process associated with generation of a signal stream.

The encoder 115 is controlled by the controller 101, and performs processing related to encoding of a supplied signal stream.

For example, in accordance with control information that permits or prohibits encoding of a signal stream, in a case where the encoding of a signal stream is permitted (not prohibited), the controller 101 causes the encoder 115 to encode a signal stream. Furthermore, for example, in accordance with control information that indicates the area of an object to be encoded subject to the permission or prohibition of encoding of a signal stream, the controller 101 causes the encoder 115 to encode a signal stream for the object to be encoded that the encoding of a signal stream therefor is permitted (not prohibited). By doing so, it becomes possible to suppress the encoding of an unnecessary signal stream, and thus it is possible to suppress the increase in load.

The encoder 115 encodes, for example, a supplied signal stream and generates encoded data (a bitstream). As a method of encoding this signal stream, any method may be used. For example, the encoder 115 may encode a signal stream by means of a variable-length code (VLC). Part D of FIG. 6 illustrates an example of the image of the encoded signal stream.

Furthermore, the encoder 115 also encodes related information other than the point cloud data, for example, the control information, etc., and stores the encoded information in the header, a parameter set, etc. appropriately.

The encoder 115 associates respective bitstreams of the above-described variety of information with one another. The term "associate" here means to be able to use (link) the other data with one data, for example, when the one data is processed. That is, pieces of data associated with one another may be integrated into one piece of data, or may be used as separate data. For example, control information associated with encoded data may be transmitted on a different transmission path from that of the encoded data. Furthermore, for example, control information associated with encoded data may be recorded on a different recording medium (or a different recording area of the same recording medium) from that of the encoded data. It is to be noted that this "association" may be performed in units of not entire data but a portion of data. For example, pieces of data may be associated with one another in arbitrary units, such as in units of several frames, one frame, or a portion of a frame.

The encoder 115 outputs the encoded data (the bitstream) obtained by such encoding to the outside of the encoding device 100. The data (the encoded data and the control information) outputted from the encoding device 100 may be, for example, decoded by a processor (not illustrated) in a subsequent stage to reconstruct data of the point cloud, or may be sent to a communication section (not illustrated) and be transmitted to another device, such as a decoding device, through a predetermined transmission path, or may be recorded on a recording medium (not illustrated).

It is to be noted that the encoder 115 may have any configuration; for example, the encoder 115 may include a CPU, a ROM, a RAM, etc., and the CPU may load a program and data that have been stored in the ROM or the like into the RAM and execute the program, thereby performing a process associated with encoding.

<Encoder>

Figure 7:
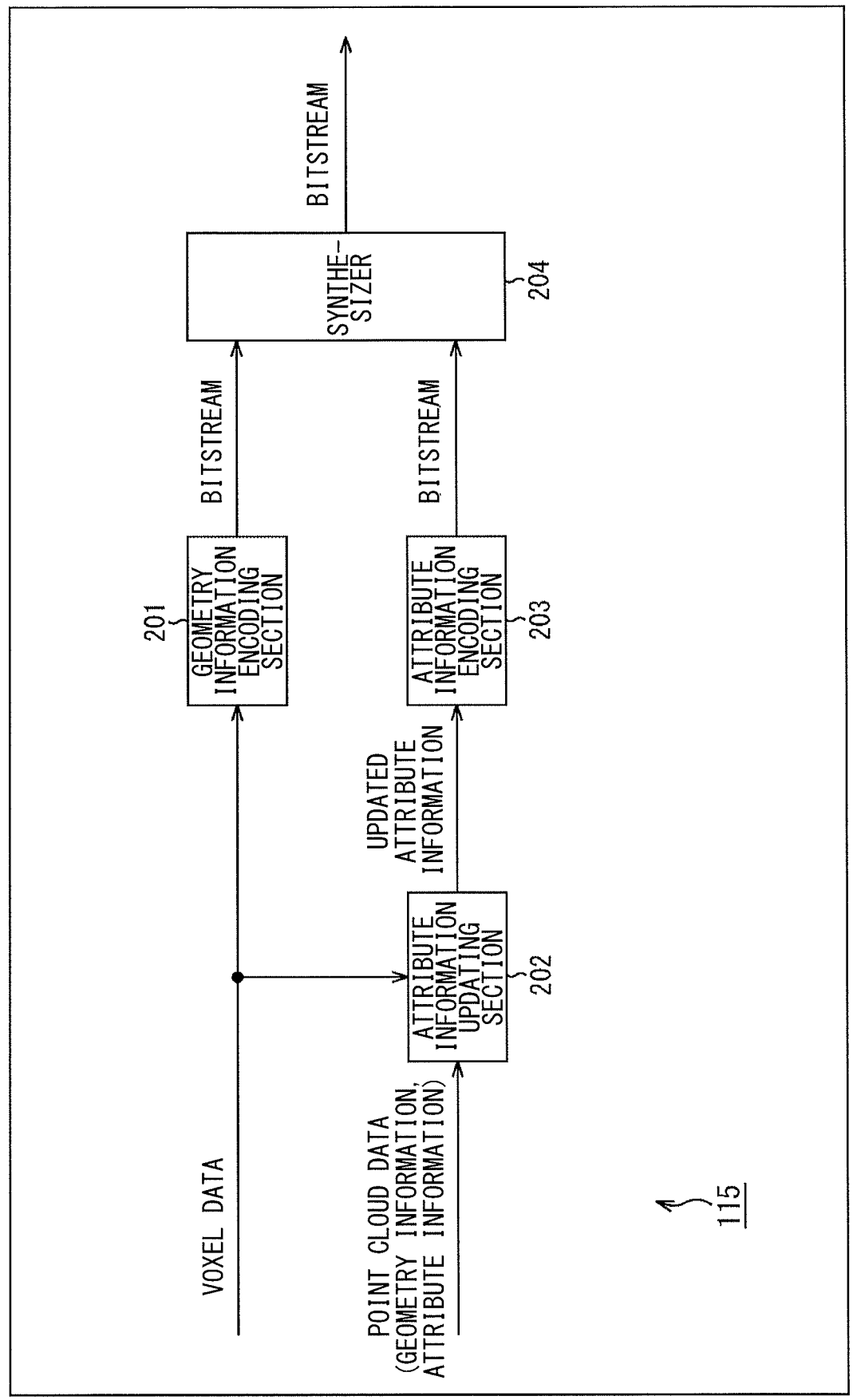
FIG. 7 is a block diagram illustrating an example of a main configuration of an encoder.

FIG. 7 is a block diagram illustrating an example of a main configuration of the encoder 115 (FIG. 5). As illustrated in FIG. 7, the encoder 115 includes a geometry information encoding section 201, an attribute information updating section 202, an attribute information encoding section 203, and a synthesizer 204.

The geometry information encoding section 201 performs processing related to encoding of geometry information, such as position information. For example, the geometry information encoding section 201 encodes a signal stream of geometry information (voxel data) supplied from the signal stream generator 114, and generates a bitstream of the encoded data. The geometry information encoding section 201 supplies the bitstream to the synthesizer 204.

It is to be noted that the geometry information encoding section 201 may have any configuration; for example, the geometry information encoding section 201 may include a CPU, a ROM, a RAM, etc., and the CPU may load a program and data that have been stored in the ROM or the like into the RAM and execute the program, thereby performing a process associated with encoding of geometry information.

The attribute information updating section 202 performs processing related to update of attribute information. For example, the attribute information updating section 202 updates attribute information of each point (each voxel) in accordance with quantization of position information. This attribute information includes, for example, at least any one of color information, an α channel, and a normal vector.

For example, the attribute information updating section 202 acquires point cloud data including geometry information and attribute information (i.e., data before quantization) from the preprocessing section 111 (FIG. 5). Furthermore, the attribute information updating section 202 acquires a signal stream of voxel data (i.e., data after quantization) from the signal stream generator 114. On the basis of these pieces of information, the attribute information updating section 202 sets, with respect to each point (voxel), a point to be compared subject to comparison in accordance with change in position information caused by quantization. Then, using attribute information of the point to be compared, the attribute information updating section 202 sets attribute information of the point. The attribute information updating section 202 supplies the attribute information updated in this way (the updated attribute information) to the attribute information encoding section 203.

It is to be noted that the attribute information updating section 202 may have any configuration; for example, the attribute information updating section 202 may include a CPU, a ROM, a RAM, etc., and the CPU may load a program and data that have been stored in the ROM or the like into the RAM and execute the program, thereby performing a process associated with update of attribute information.

The attribute information encoding section 203 performs processing related to encoding of attribute information. For example, the attribute information encoding section 203 encodes updated attribute information that is attribute information updated by the attribute information updating section 202, and generates a bitstream of the encoded data. The attribute information encoding section 203 supplies the bitstream to the synthesizer 204.

It is to be noted that the attribute information encoding section 203 may have any configuration; for example, the attribute information encoding section 203 may include a CPU, a ROM, a RAM, etc., and the CPU may load a program and data that have been stored in the ROM or the like into the RAM and execute the program, thereby performing a process associated with encoding of attribute information.

The synthesizer 204 performs processing related to synthesis of bitstreams. For example, the synthesizer 204 synthesizes a bitstream of geometry information supplied from the geometry information encoding section 201 and a bitstream of attribute information supplied from the attribute information encoding section 203 to integrate them into one bitstream. It is to be noted that this bitstream may include metadata, such as the header and a parameter set. The synthesizer 204 outputs the bitstream to the outside of the encoding device 100.

It is to be noted that the synthesizer 204 may have any configuration; for example, the synthesizer 204 may include a CPU, a ROM, a RAM, etc., and the CPU may load a program and data that have been stored in the ROM or the like into the RAM and execute the program, thereby performing a process associated with synthesis of bitstreams.

<Attribute Information Updating Section>

Figure 8:
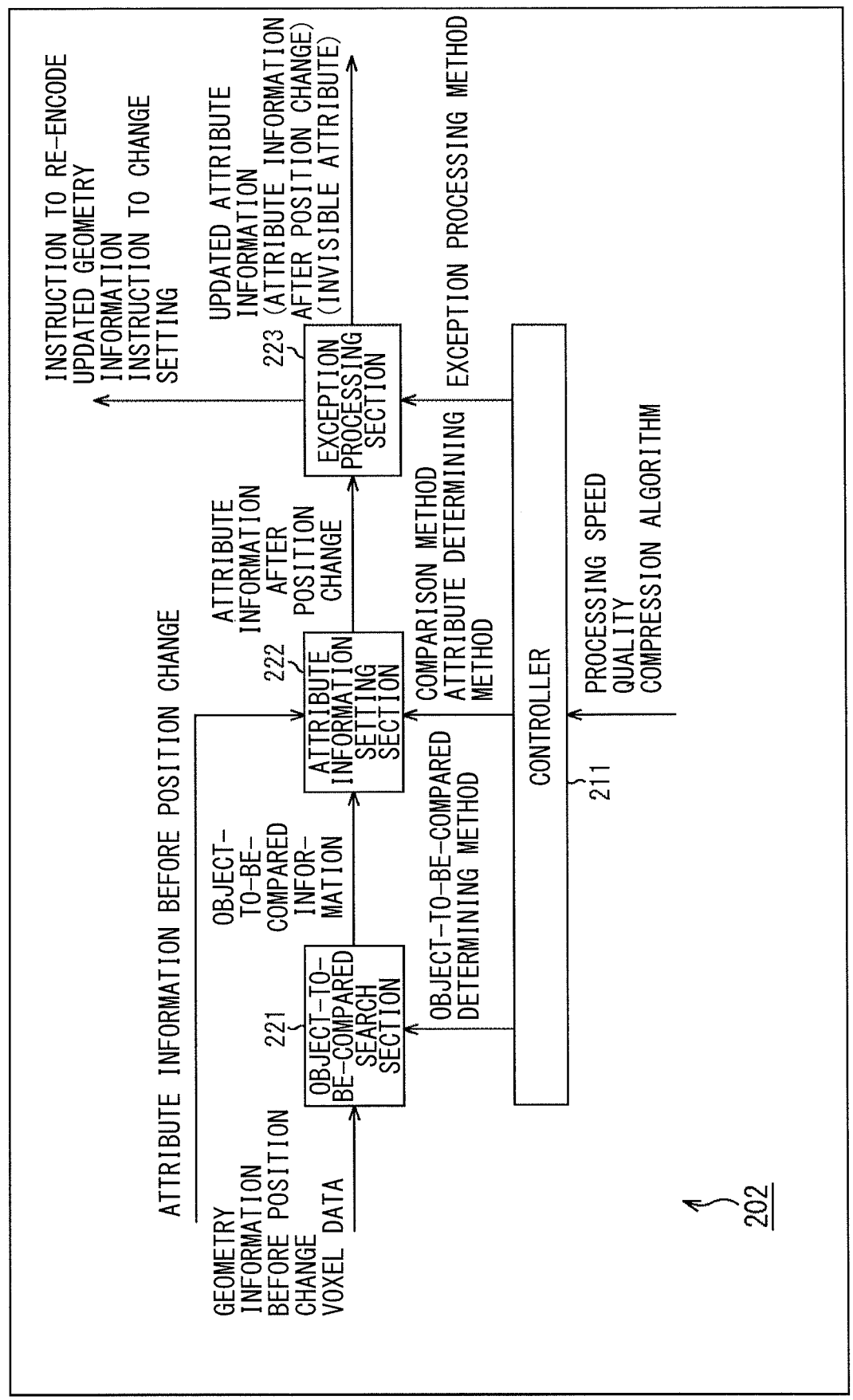
FIG. 8 is a block diagram illustrating an example of a main configuration of an attribute information updating section.

FIG. 8 is a block diagram illustrating an example of a main configuration of the attribute information updating section 202 (FIG. 7). As illustrated in FIG. 8, the attribute information updating section 202 includes a controller 211, an object-to-be-compared search section 221, an attribute information setting section 222, and an exception processing section 223.

The controller 211 controls the operations of the object-to-be-compared search section 221 to the exception processing section 223. For example, the controller 211 sets respective methods, etc. of processing performed by the object-to-be-compared search section 221 to the exception processing section 223 on the basis of information related to the processing, such as a condition for the processing (a request from the outside), a mode of the processing, or a parameter used in the processing.

For example, the controller 211 performs this setting on the basis of information regarding processing speed, quality, and a compression algorithm. For example, the controller 211 sets an object-to-be-compared determining method, and controls and causes the object-to-be-compared search section 221 to determine an object to be compared by the method. Furthermore, for example, the controller 211 sets a comparison method, and controls and causes the attribute information setting section 222 to make a comparison of attribute information by the method. Moreover, for example, the controller 211 sets an attribute determining method, and controls and causes the attribute information setting section 222 to determine an attribute by the method. Furthermore, for example, the controller 211 sets an exception processing method, and controls and causes the exception processing section 223 to perform exception processing by the method.

It is to be noted that the controller 211 may have any configuration; for example, the controller 211 may include a CPU, a ROM, a RAM, etc., and the CPU may load a program and data that have been stored in the ROM or the like into the RAM and execute the program, thereby performing a process associated with control.

The object-to-be-compared search section 221 acquires geometry information before quantization (geometry information before position change) and geometry information after quantization (voxel data), and searches for a point to be compared with a current point using the acquired information by the method set by the controller 211. When having identified the point to be compared, the object-to-be-compared search section 221 supplies object-to-be-compared information that is information regarding the point to be compared to the attribute information setting section 222.

It is to be noted that the object-to-be-compared search section 221 may have any configuration; for example, the object-to-be-compared search section 221 may include a CPU, a ROM, a RAM, etc., and the CPU may load a program and data that have been stored in the ROM or the like into the RAM and execute the program, thereby performing a process associated with search for a point to be compared.

The attribute information setting section 222 acquires attribute information before quantization (attribute information before position change), besides the object-to-be-compared information. Using these pieces of information, the attribute information setting section 222 compares the current point and the point to be compared by the method set by the controller 211. Furthermore, using attribute information of the point to be compared, the attribute information setting section 222 determines an attribute of the current point by the method set by the controller 211, and sets attribute information and reflects the attribute. The attribute information setting section 222 supplies the set attribute information (attribute information after position change) of the current point to the exception processing section 223. This attribute information includes at least any one of color information, an α channel, and a normal vector.

It is to be noted that the attribute information setting section 222 may have any configuration; for example, the attribute information setting section 222 may include a CPU, a ROM, a RAM, etc., and the CPU may load a program and data that have been stored in the ROM or the like into the RAM and execute the program, thereby performing a process associated with setting of attribute information.

The exception processing section 223 performs, in a case where there is no point to be compared found, exception processing by the method set by the controller 211. Details of the exception processing will be described later. In a case where exception processing is not performed, the exception processing section 223 supplies, as updated attribute information, the attribute information after position change supplied from the attribute information setting section 222 to the attribute information encoding section 203 (FIG. 7).

It is to be noted that the exception processing section 223 may have any configuration; for example, the exception processing section 223 may include a CPU, a ROM, a RAM, etc., and the CPU may load a program and data that have been stored in the ROM or the like into the RAM and execute the program, thereby performing a process associated with exception processing.

<Controller>

Figure 9:
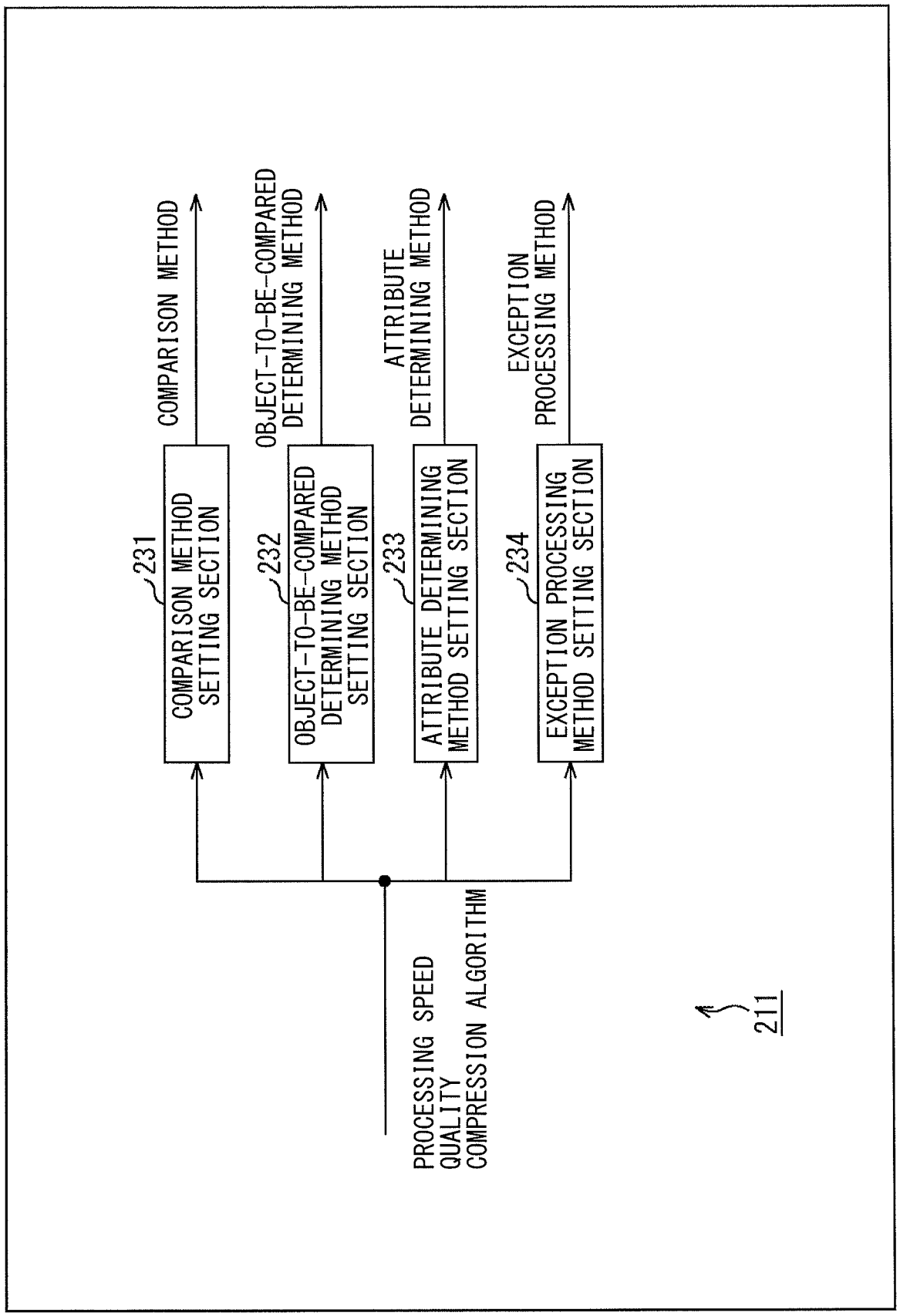
FIG. 9 is a block diagram illustrating an example of a main configuration of a controller.

FIG. 9 is a block diagram illustrating an example of a main configuration of the controller 211 (FIG. 8). As illustrated in FIG. 9, the controller 211 includes, for example, a comparison method setting section 231, an object-to-be-compared determining method setting section 232, an attribute determining method setting section 233, and an exception processing method setting section 234.

Figure 10:
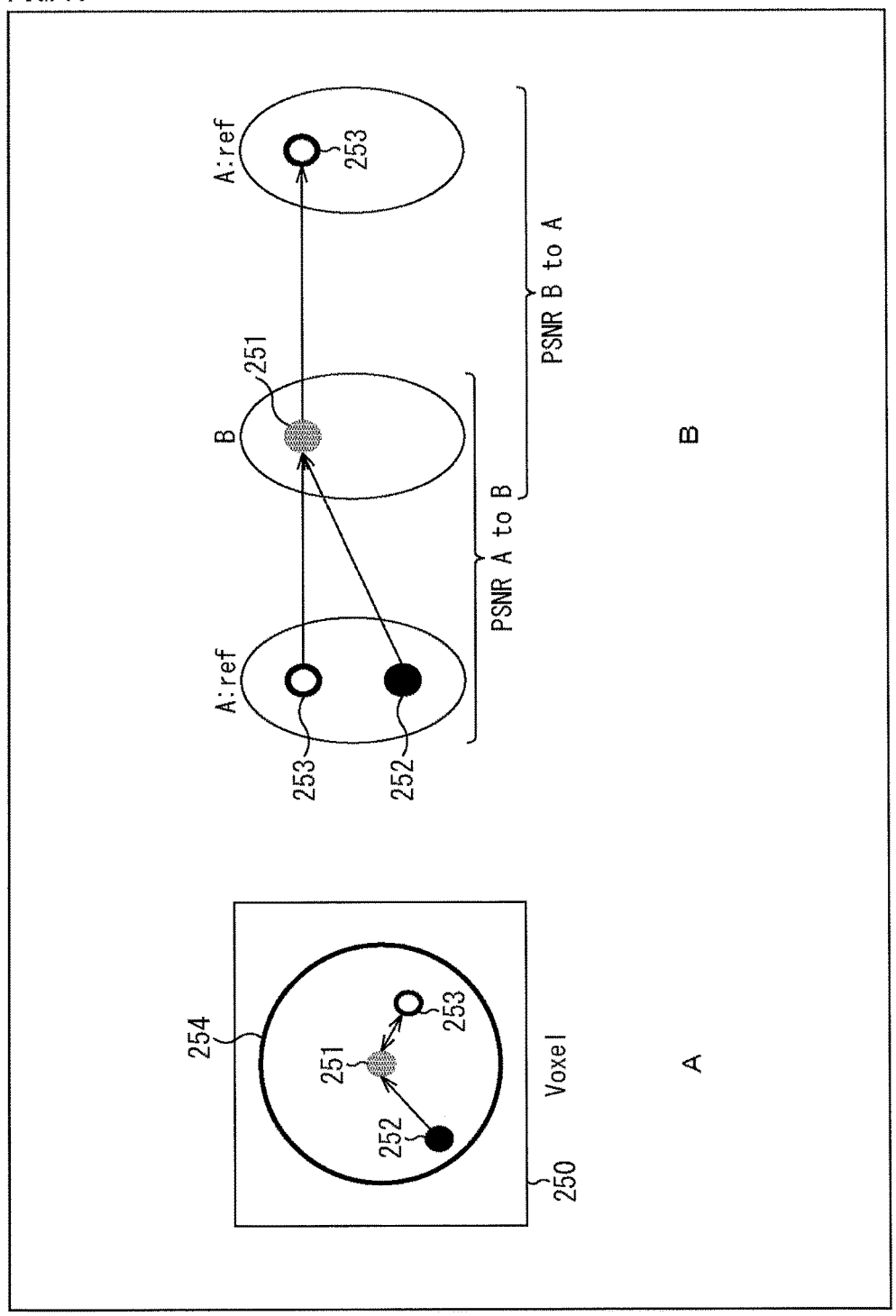
FIG. 10 is a diagram illustrating an example of how the positions of points change.

The comparison method setting section 231 performs processing related to setting of a comparison method. Any comparison method may be used; for example, as illustrated in part B of FIG. 10, a method of determining a color by a relationship of AtoB, a method of determining a color by a relationship of BtoA, and a method of determining a color by a relationship on both AtoB and BtoA are prepared as candidates, and the comparison method setting section 231 selects any one from among these methods. For example, the comparison method setting section 231 selects any one from among these methods on the basis of various conditions (for example, processing speed, quality, a compression algorithm, etc.).

For example, in a case where the comparison method setting section 231 has set, as a comparison method, the method of determining a color by the relationship of AtoB, the attribute information setting section 222 sets attribute information of a point 251 that is a current point using respective pieces of attribute information of points 253 and 252 that are points to be compared.

Furthermore, for example, in a case where the comparison method setting section 231 has set, as a comparison method, the method of determining a color by the relationship of BtoA, the attribute information setting section 222 sets attribute information of the point 251 that is a current point using attribute information of the point 253 that is a point to be compared.

Moreover, for example, in a case where the comparison method setting section 231 has set, as a comparison method, the method of determining a color by the relationship on AtoB and BtoA, the attribute information setting section 222 sets attribute information of the point 251 that is a current point using respective pieces of attribute information of the points 252 and 253 or attribute information of the point 253.

It is to be noted that the comparison method setting section 231 may have any configuration; for example, the comparison method setting section 231 may include a CPU, a ROM, a RAM, etc., and the CPU may load a program and data that have been stored in the ROM or the like into the RAM and execute the program, thereby performing a process associated with setting of a comparison method.

The object-to-be-compared determining method setting section 232 performs processing related to setting of a method of determining an object to be compared. Any method of determining an object to be compared may be used; for example, it may be a method of selecting, in point cloud data before update of position information, a point located nearest to a current point as a point to be compared. In a case of this method, for example, as illustrated in part A of FIG. 10, the object-to-be-compared search section 221 selects, of the points 252 and 253 located near the point 251 that is a current point, the point located nearer (located nearest) to the current point as a point to be compared.

Furthermore, for example, it may be a method of selecting, in point cloud data before update of position information, a point that is located at a distance shorter than a predetermined distance r and is located nearest to the current point as a point to be compared. In a case of this method, for example, as illustrated in part A of FIG. 10, the object-to-be-compared search section 221 sets a circle 254 of a radius r with the point 251 that is a current point as the center, and selects, of the points 252 and 253 located inside the circle 254, the point located nearer (located nearest) to the current point as a point to be compared. In this case, the maximum value r of the distance between the current point and the point to be compared is set, and therefore it may well be that there is no point to be compared. In that case, the exception processing section 223 performs exception processing.

Moreover, for example, it may be a method of selecting, in point cloud data before update of position information, a point that is selected in accordance with another algorithm, and is located at a distance shorter than the predetermined distance r to the current point as a point to be compared. Any algorithm may be used as the other algorithm; for example, it may be an algorithm to determine an object to be compared to cause it to be well adapted to a subjective structure, for example, to cause an error of an edge portion to be reduced. In a case of this method, for example, as illustrated in part A of FIG. 10, the object-to-be-compared search section 221 sets the circle 254 of the radius r with the point 251 that is a current point as the center, and selects, of the points 252 and 253 located inside the circle 254, the point selected in accordance with the other algorithm as a point to be compared.

For example, multiple methods like these are prepared as candidates, and the object-to-be-compared determining method setting section 232 selects any one from among these methods. For example, the object-to-be-compared determining method setting section 232 selects any one from among these methods on the basis of various conditions (for example, processing speed, quality, a compression algorithm, etc.).

It is to be noted that the object-to-be-compared determining method setting section 232 may have any configuration; for example, the object-to-be-compared determining method setting section 232 may include a CPU, a ROM, a RAM, etc., and the CPU may load a program and data that have been stored in the ROM or the like into the RAM and execute the program, thereby performing a process associated with setting of a method of determining an object to be compared.

The attribute determining method setting section 233 performs processing related to setting of a method of determining an attribute. Any method of determining an attribute may be used; for example, it may be a method of selecting one from attributes of a point to be compared and applying the selected attribute to an attribute of a current point. To explain with an example of part A of FIG. 10, in this case, the attribute information setting section 222 applies attribute information of either one of the points 252 and 253 that are points to be compared to the point 251 that is a current point.

Furthermore, for example, an average of respective attributes of multiple points to be compared may be applied to an attribute of a current point. To explain with an example of part A of FIG. 10, in this case, the attribute information setting section 222 applies an average of respective pieces of attribute information of the both points 252 and 253 that are points to be compared to the point 251 that is a current point.

Moreover, for example, respective attributes of points to be compared may be weighted, and their average (a weighted average) may be applied to an attribute of a current point. To explain with an example of part A of FIG. 10, in this case, the attribute information setting section 222 applies a weighted average of respective pieces of attribute information of the both points 252 and 253 that are points to be compared to the point 251 that is a current point.

It is to be noted that this weight (coefficient) may be set in accordance with, for example, a distance from a point to be compared to the current point, a feature (for example, brightness) of attribute information of the point to be compared, etc.

For example, multiple methods like these are prepared as candidates, and the attribute determining method setting section 233 selects any one from among these methods. For example, the attribute determining method setting section 233 selects any one from among these methods on the basis of various conditions (for example, processing speed, quality, a compression algorithm, etc.).

It is to be noted that the attribute determining method setting section 233 may have any configuration; for example, the attribute determining method setting section 233 may include a CPU, a ROM, a RAM, etc., and the CPU may load a program and data that have been stored in the ROM or the like into the RAM and execute the program, thereby performing a process associated with setting of a method of determining an attribute.

The exception processing method setting section 234 performs processing related to setting of an exception processing method. Any exception processing method may be used; for example, a current point having no point to be compared may be caused to be invisible. In this case, the exception processing section 223 provides, for example, a current point having no point to be compared with an invisible attribute (no_color_attribute) (sets bits, or defines an invisible color in the header or the like sets the current point in that color). The exception processing section 223 supplies, as updated attribute information, attribute information provided with the invisible attribute to the attribute information encoding section 203.

Furthermore, for example, a current point having no point to be compared may be excluded from objects to be encoded. In this case, the exception processing section 223 excludes, for example, the current point having no point to be compared from objects to be encoded, and supplies a point cloud excluding the point (updated geometry information) to the preprocessing section 111, etc. and requests them to re-encode the point cloud. In accordance with the request, the encoding device 100 encodes the point cloud excluding the point having no point to be compared found.

Moreover, for example, the encoding method (for example, the mode, the parameter, etc.) may be changed to avoid the occurrence of a current point having no point to be compared. In this case, the exception processing section 223 requests, for example, the preprocessing section 111, etc. to re-encode the point cloud. At that time, the exception processing section 223 requests them to change the encoding method and re-encode the point cloud.

The encoding method may be changed to any method. For example, DAG TH, a threshold used in a directed acyclic graph (DAG) (also referred to as an effective directional graph), may be changed.

For example, multiple methods like these are prepared as candidates, and the exception processing method setting section 234 selects any one from among these methods. For example, the exception processing method setting section 234 selects any one from among these methods on the basis of various conditions (for example, processing speed, quality, a compression algorithm, etc.).

It is to be noted that the exception processing method setting section 234 may have any configuration; for example, the exception processing method setting section 234 may include a CPU, a ROM, a RAM, etc., and the CPU may load a program and data that have been stored in the ROM or the like into the RAM and execute the program, thereby performing a process associated with setting of an exception processing method.

By searching for an object to be compared in consideration of the change in position in this way, the encoding device 100 becomes able to set attribute information on each point, which suppresses the reduction in the subjective image quality of the point cloud.

<Example of Control>

For example, in a case where the position of a point is shifted, or in a case where the number of points is decreased, as illustrated by a table in part A of FIG. 11, the comparison method setting section 231 to the exception processing method setting section 234 of the controller 211 may set a method for each corresponding process in accordance with use application (high speed, high quality (emphasis on an objective indicator), high quality (emphasis on a subjective indicator), etc.). Furthermore, for example, in a case where the number of points is increased by resampling or the like, as illustrated by a table in part B of FIG. 11, the comparison method setting section 231 to the exception processing method setting section 234 of the controller 211 may set a method for each corresponding process in accordance with use application (high speed, high quality (emphasis on an objective indicator), high quality (emphasis on a subjective indicator), etc.).

By controlling the processing in accordance with use application in the way described above, the encoding device 100 becomes able to suppress the unnecessary processing load and the increase in processing time.

<Flow of Encoding Process>

The flow of an encoding process performed by the encoding device 100 having the above-described configuration is described with reference to a flowchart illustrated in FIG. 12.

When the encoding process starts, at Step S101, the preprocessing section 111 performs preprocessing on inputted data.

At Step S102, the bounding box setting section 112 sets a bounding box on the preprocessed data.

At Step S103, the voxel setting section 113 sets voxels on the bounding box set at Step S102.

At Step S104, the signal stream generator 114 generates a signal stream on the basis of a data structure.

At Step S105, the encoder 115 encodes the signal stream generated through the process at Step S104

At Step S106, the encoder 115 outputs a bitstream obtained by the encoding to the outside of the encoding device 100. This bitstream is, for example, transmitted to the decoding side (a decoding device or the like) or recorded on a recording medium.

When the process at Step S106 has been finished, the encoding process ends. For example, in a case where an object to be encoded is a moving image, this series of processes is performed frame by frame.

<Flow of Signal Stream Encoding Process>

Figure 12:
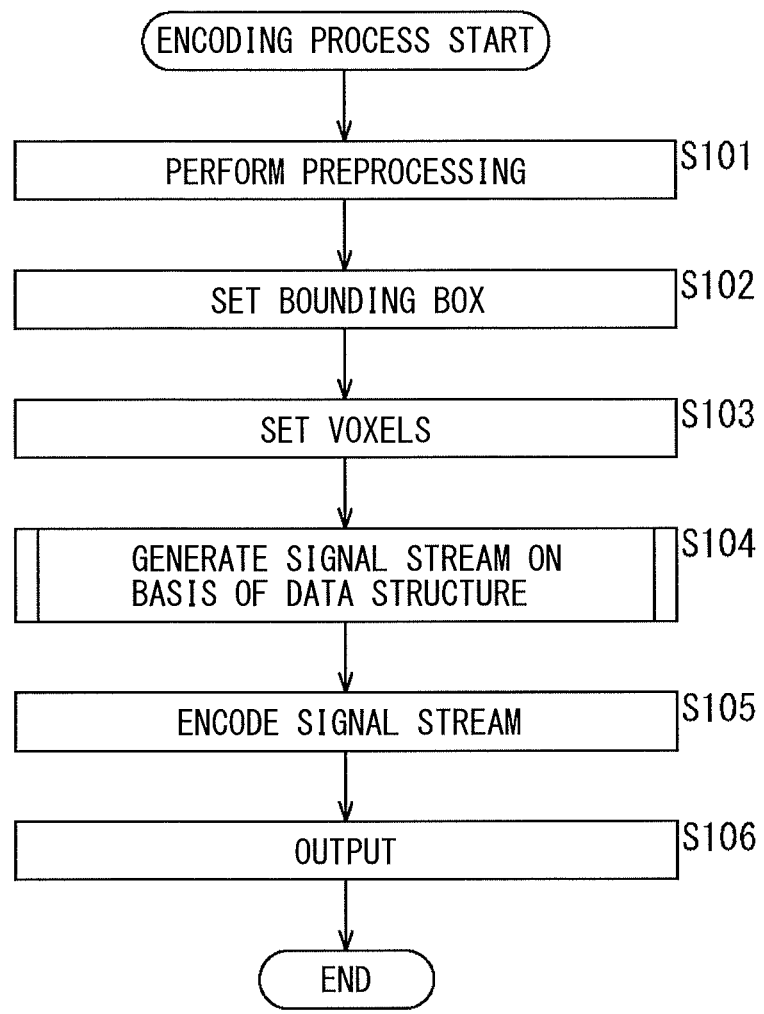
FIG. 12 is a flowchart that describes an example of a flow of an encoding process.

Subsequently, an example of the flow of a signal stream encoding process performed at Step S105 in FIG. 12 is described with reference to a flowchart illustrated in FIG. 13.

When the signal stream encoding process starts, at Step S121, the geometry information encoding section 201 encodes voxel data.

At Step S122, the attribute information updating section 202 updates attribute information.

At Step S123, the attribute information encoding section 203 encodes the attribute information updated at Step S122.

At Step S124, the synthesizer 204 synthesizes a bitstream obtained through the process at Step S121 and a bitstream obtained through the process at Step S123.

When the process at Step S124 has been finished, the signal stream encoding process ends, and the process returns to FIG. 12.

<Flow of Attribute Information Updating Process>

Figure 13:
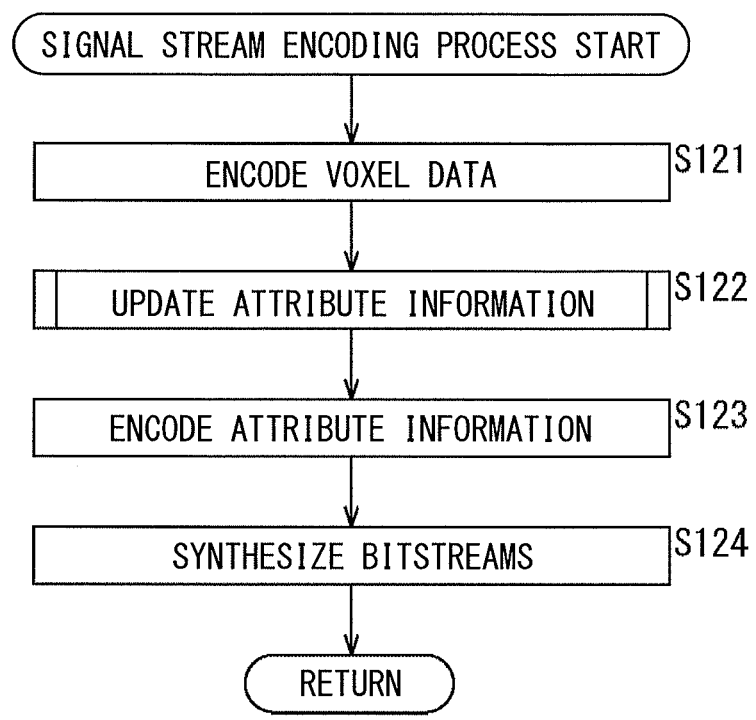
FIG. 13 is a flowchart that describes an example of a flow of a signal stream encoding process.

Subsequently, an example of the flow of an attribute information updating process performed at Step S122 in FIG. 13 is described with reference to a flowchart illustrated in FIG. 14.

When the attribute information updating process starts, at Step S141, the controller 211 performs a control process, and determines a method for each process.

At Step S142, the object-to-be-compared search section 221 searches for a point to be compared in accordance with an object-to-be-compared determining method set at Step S141.

At Step S143, the attribute information setting section 222 determines whether or not to set attribute information on a current point. In a case where it is determined to set attribute information, the process moves on to Step S144.

At Step S144, the attribute information setting section 222 sets attribute information of the current point in accordance with a comparison method and an attribute determining method set at Step S141.

When the process at Step S144 has been finished, the process moves on to Step S145. Furthermore, at Step S143, for example, in a case where there is no point to be compared found, and it is determined not to set attribute information on the current point, the process moves on to Step S145.

At Step S145, the exception processing section 223 determines whether or not to perform exception processing. For example, in a case where there is no point to be compared found, and it is determined to perform exception processing, the process moves on to Step S146.

At Step S146, the exception processing section 223 performs exception processing in accordance with an exception processing method set at Step S141.

When the process at Step S146 has been finished, the attribute information updating process ends, and the process returns to FIG. 13. Furthermore, at Step S145, for example, in a case where there is a point to be compared found, and it is determined not to perform exception processing, the process at Step S146 is omitted, and the attribute information updating process ends, and then the process returns to FIG. 13.

<Flow of Control Process>

Figure 14:
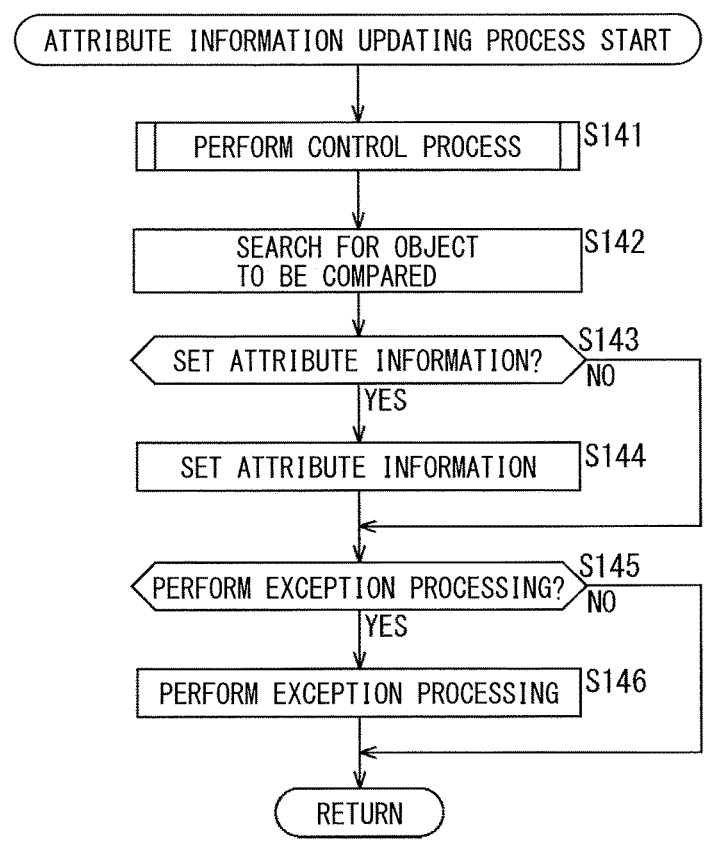
FIG. 14 is a flowchart that describes an example of a flow of an attribute information updating process.
Figure 15:
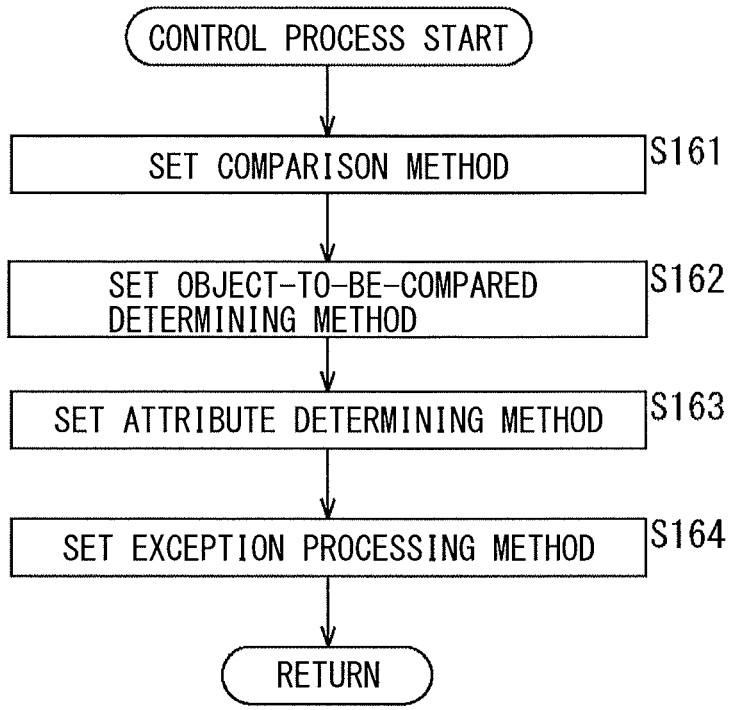
FIG. 15 is a flowchart that describes an example of a flow of a control process.

Subsequently, an example of the flow of the control process performed at Step S141 in FIG. 14 is described with reference to a flowchart illustrated in FIG. 15.

When the control process starts, at Step S161, the comparison method setting section 231 sets a comparison method, and supplies this set method to the attribute information setting section 222.

At Step S162, the object-to-be-compared determining method setting section 232 sets an object-to-be-compared determining method, and supplies this set method to the object-to-be-compared search section 221.

At Step S163, the attribute determining method setting section 233 sets an attribute determining method, and supplies this set method to the attribute information setting section 222.

At Step S164, the exception processing method setting section 234 sets an exception processing method, and supplies this set method to the exception processing section 223.

When the process at Step S164 has been finished, the control process ends.

By performing the processes in the way as described above, the encoding device 100 becomes able to suppress the unnecessary processing load and the increase in processing time.

<Evaluation of Processing>

Figure 16:
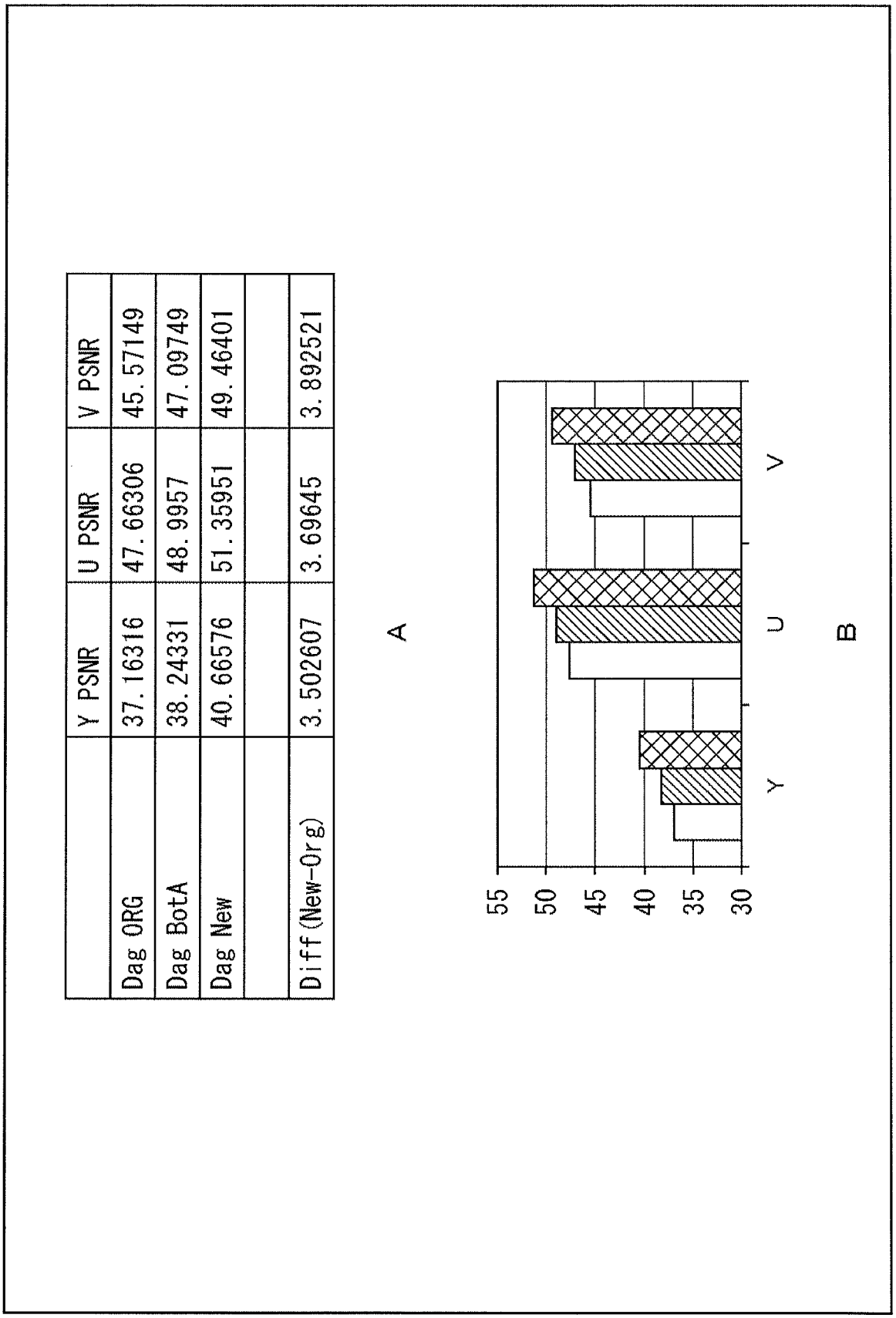
FIG. 16 is a diagram that describes an example of comparison of PSNR.

FIG. 16 illustrates, comparison of respective PSNR evaluation results in a case where DAG (effective directional graph) processing is performed by the existing method (Dag ORG), a method of updating attribute information in consideration of change in geometry information on the direction BtoA (Dag BtoA), and a method of updating attribute information in consideration of change in geometry information between AtoB and BtoA (Dag New).

Part A of FIG. 16 illustrates comparison of respective values of PSNR in the methods with respect to each of Y, U, and V components, and part B of FIG. 16 illustrates the values of PSNR illustrated in part A in bar graph form. A white bar graph in part B of FIG. 16 corresponds to Dag ORG in a table illustrated in part A of FIG. 16; a shaded bar graph in part B of FIG. 16 corresponds to Dag BtoA in the table illustrated in part A of FIG. 16; and a cross-hatched bar graph in part B of FIG. 16 corresponds to Dag New in the table illustrated in part A of FIG. 16.

As illustrated in FIG. 16, by searching for an object to be compared in consideration of the change in position by the application of the present technology, it becomes possible to improve the PSNR. Therefore, it is possible to suppress the reduction in the subjective image quality of the point cloud.

3. Second Embodiment

<Decoding Device>

The decoding device that decodes a bitstream generated by the encoding device 100 also decodes attribute information together with geometry information. Furthermore, in a case where an invisible attribute (no_color_attribute) is set on a point, the decoding device performs processing to cause the point to be invisible.

Figure 17:
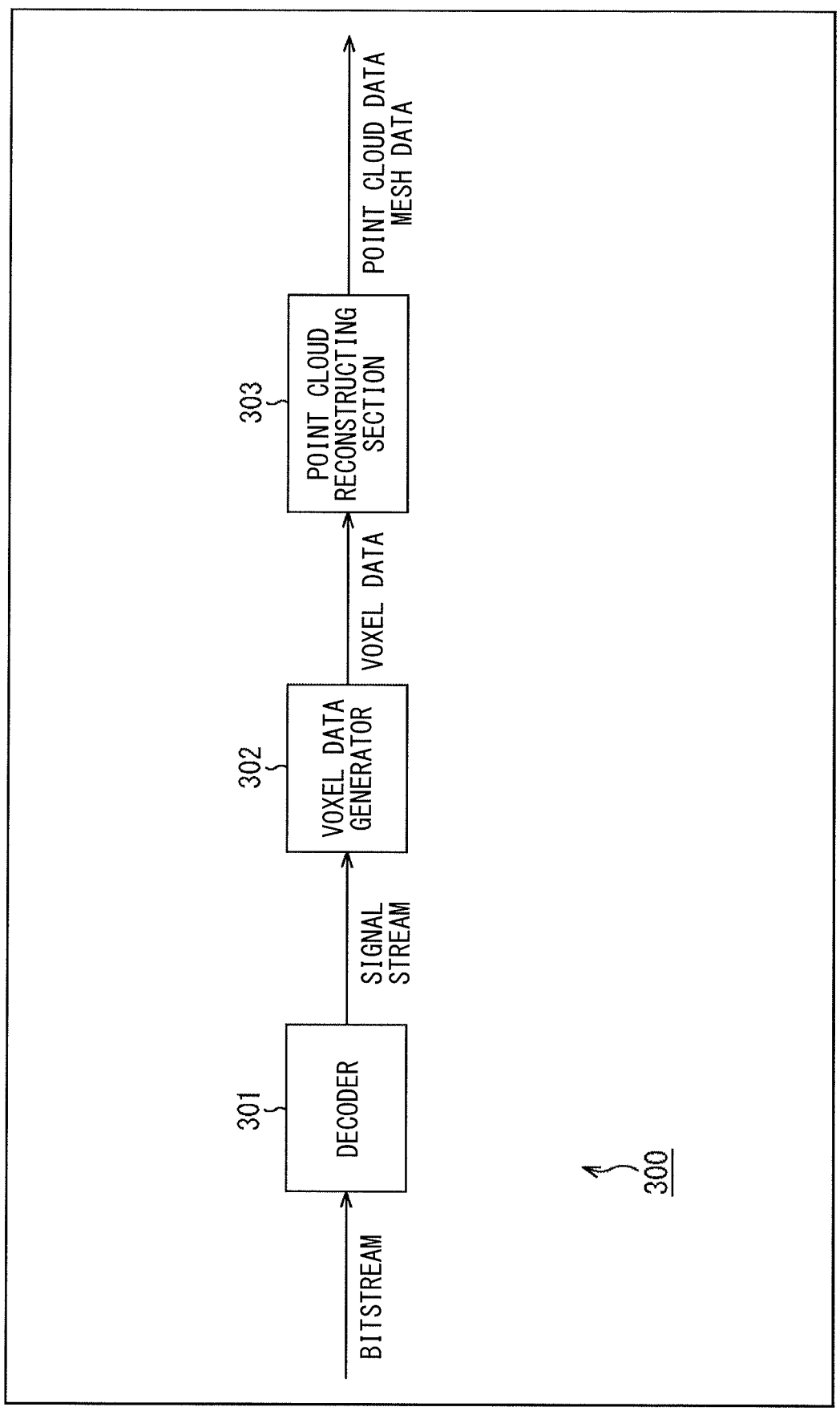
FIG. 17 is a block diagram illustrating an example of a main configuration of a decoding device.

FIG. 17 is a block diagram illustrating an example of a main configuration of the decoding device that is an embodiment of the information processing apparatus to which the present technology is applied. A decoding device 300 illustrated in FIG. 17 is a decoding device compatible with the encoding device 100 illustrated in FIG. 5, and, for example, decodes encoded data of a point cloud generated by this encoding device 100 and reconstructs data of the point cloud.

As illustrated in FIG. 17, the decoding device 300 includes a decoder 301, a voxel data generator 302, and a point cloud reconstructing section 303.

The decoder 301 performs processing related to decoding of a bitstream. For example, the decoder 301 decodes the bitstream by a decoding method corresponding to the encoding method of the encoder 115, and extracts a signal stream of geometry information and attribute information from the bitstream. The decoder 301 supplies the signal stream extracted from the bitstream to the voxel data generator 302.

It is to be noted that the decoder 301 may have any configuration; for example, the decoder 301 may include a CPU, a ROM, a RAM, etc., and the CPU may load a program and data that have been stored in the ROM or the like into the RAM and execute the program, thereby performing a process associated with decoding.

The voxel data generator 302 performs processing related to generation of voxel data. For example, the voxel data generator 302 generates voxel data corresponding to the signal stream supplied from the decoder 301. The voxel data generator 302 supplies the generated voxel data to the point cloud reconstructing section 303.

It is to be noted that the voxel data generator 302 may have any configuration; for example, the voxel data generator 302 may include a CPU, a ROM, a RAM, etc., and the CPU may load a program and data that have been stored in the ROM or the like into the RAM and execute the program, thereby performing a process associated with generation of voxel data.

The point cloud reconstructing section 303 performs processing related to reconstruction of point cloud data. For example, the point cloud reconstructing section 303 converts the supplied voxel data into point cloud data (generates decoded point cloud data). It is to be noted that the point cloud reconstructing section 303 may further convert the decoded point cloud data into mesh data.

The point cloud reconstructing section 303 outputs the generated decoded point cloud data (or mesh data) to the outside of the decoding device 300. This outputted decoded point cloud data (or mesh data) may be, for example, subjected to image processing by a processor (not illustrated) in a subsequent stage and be displayed as image information on a monitor or the like, or may be sent to a communication section (not illustrated) and be transmitted to another device through a predetermined transmission path, or may be recorded on a recording medium (not illustrated).

It is to be noted that the point cloud reconstructing section 303 may have any configuration; for example, the point cloud reconstructing section 303 may include a CPU, a ROM, a RAM, etc., and the CPU may load a program and data that have been stored in the ROM or the like into the RAM and execute the program, thereby performing a process associated with reconstruction of point cloud data.

As described above, the decoding device 300 is able to correctly decode a bitstream generated by the encoding device 100. Therefore, the decoding device 300 is able to realize the suppression of reduction in the subjective image quality.

<Decoder>

Figure 18:
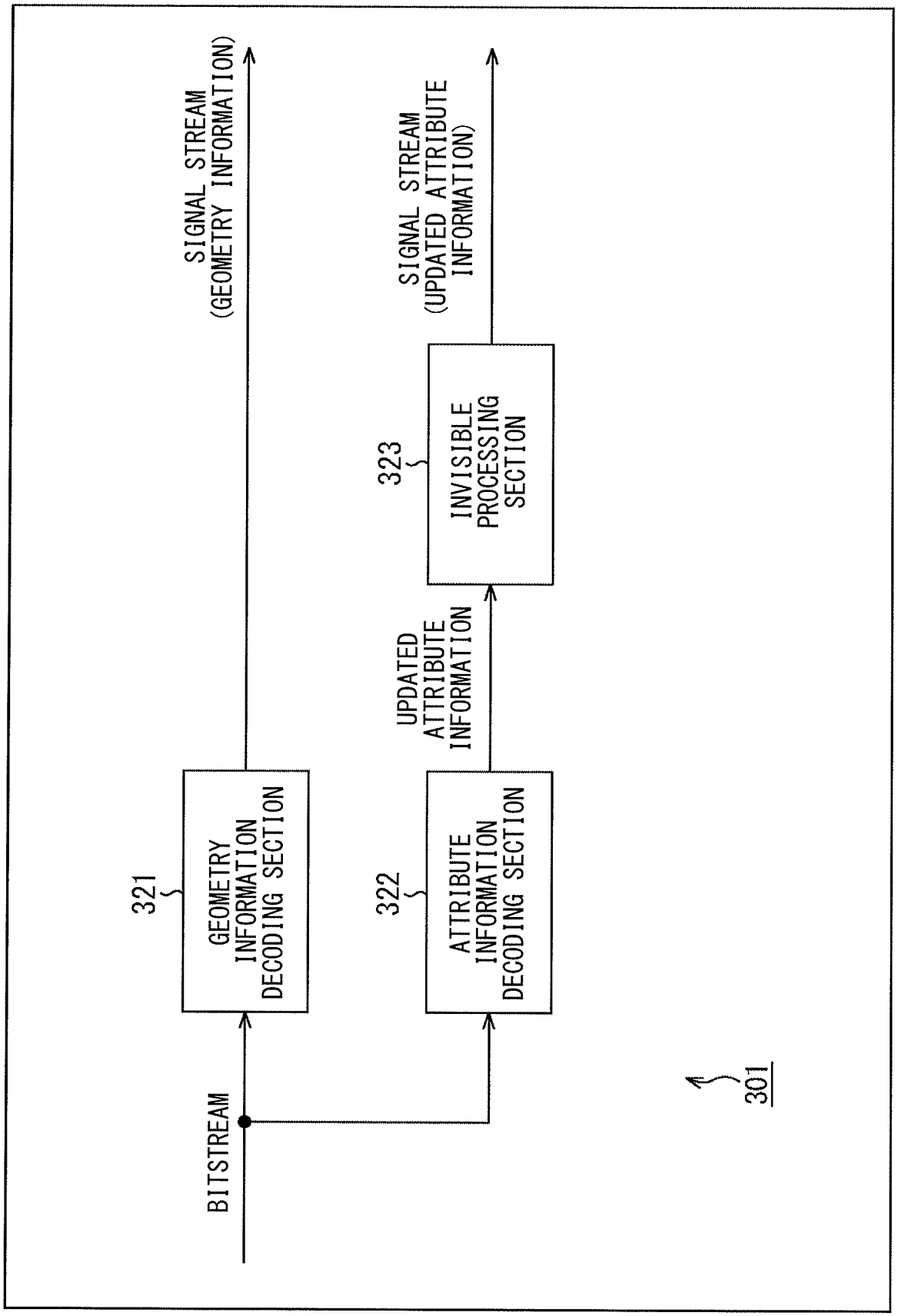
FIG. 18 is a block diagram illustrating an example of a main configuration of a decoder.

FIG. 18 is a block diagram illustrating an example of a main configuration of the decoder 301. As illustrated in FIG. 18, the decoder 301 includes a geometry information decoding section 321, an attribute information decoding section 322, and an invisible processing section 323.

The geometry information decoding section 321 decodes a supplied bitstream, and extracts a signal stream of geometry information. The geometry information decoding section 321 supplies the extracted signal stream of geometry information to the voxel data generator 302 (FIG. 17).

It is to be noted that the geometry information decoding section 321 may have any configuration; for example, the geometry information decoding section 321 may include a CPU, a ROM, a RAM, etc., and the CPU may load a program and data that have been stored in the ROM or the like into the RAM and execute the program, thereby performing a process associated with decoding of geometry information.

The attribute information decoding section 322 decodes a supplied bitstream, and extracts a signal stream of attribute information (updated attribute information). The attribute information decoding section 322 supplies the extracted signal stream of attribute information (updated attribute information) to the invisible processing section 323.

It is to be noted that the attribute information decoding section 322 may have any configuration; for example, the attribute information decoding section 322 may include a CPU, a ROM, a RAM, etc., and the CPU may load a program and data that have been stored in the ROM or the like into the RAM and execute the program, thereby performing a process associated with decoding of attribute information.

The invisible processing section 323 performs invisible processing to cause a point provided with an invisible attribute (no_color_attribute) to be invisible using the supplied signal stream of attribute information (updated attribute information). The invisible processing section 323 appropriately supplies the signal stream of attribute information (updated attribute information) subjected to the invisible processing to the voxel data generator 302 (FIG. 17).

It is to be noted that the invisible processing section 323 may have any configuration; for example, the invisible processing section 323 may include a CPU, a ROM, a RAM, etc., and the CPU may load a program and data that have been stored in the ROM or the like into the RAM and execute the program, thereby performing a process associated with invisibility.

As described above, the decoding device 300 is able to correctly decode a bitstream generated by the encoding device 100. Therefore, the decoding device 300 is able to realize the suppression of reduction in the subjective image quality of a point cloud.

<Flow of Decoding Process>

An example of the flow of a decoding process performed by the decoding device 300 in this case is described with reference to a flowchart illustrated in FIG. 19.

When the decoding process starts, at Step S301, the decoder 301 decodes a bitstream and extracts a signal stream.

At Step S302, the voxel data generator 302 reconstructs voxel data from the signal stream extracted at Step S301.

At Step S303, the point cloud reconstructing section 303 reconstructs point cloud data from the voxel data obtained through the process at Step S302.

At Step S304, the point cloud reconstructing section 303 outputs the reconstructed point cloud data (decoded point cloud data) to the outside of the decoding device 300.

When the process at Step S304 has been finished, the decoding process ends.

<Flow of Bitstream Decoding Process>

Figure 19:
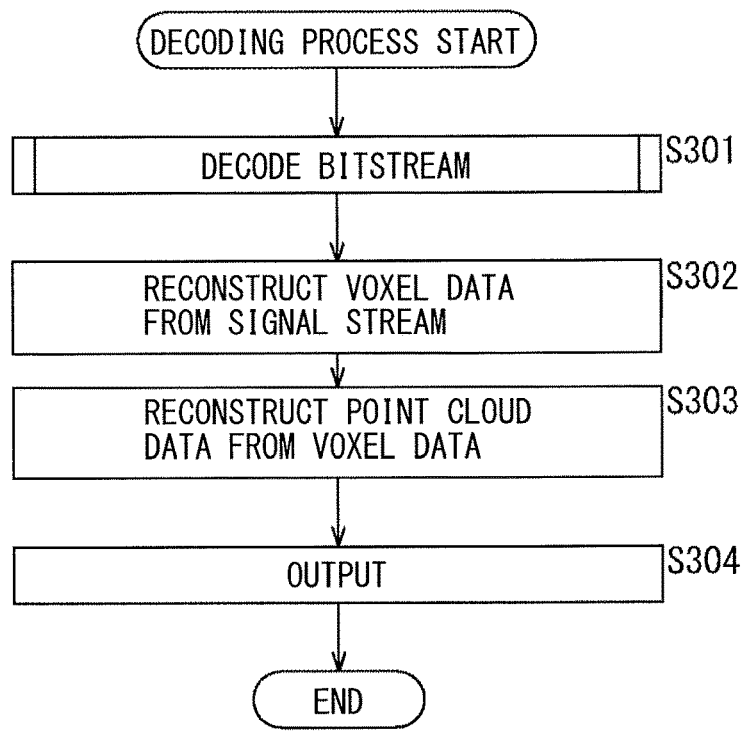
FIG. 19 is a flowchart that describes an example of a flow of a decoding process.
Figure 20:
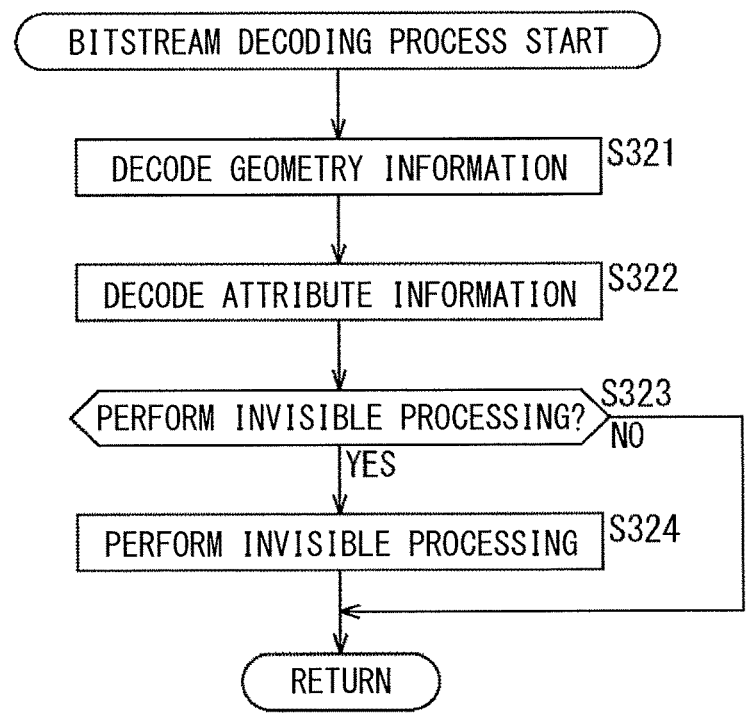
FIG. 20 is a flowchart that describes an example of a flow of a bitstream decoding process.

Subsequently, an example of the flow of a bitstream decoding process performed at Step S301 in FIG. 19 is described with reference to a flowchart illustrated in FIG. 20.

When the bitstream decoding process starts, at Step S321, the geometry information decoding section 321 decodes a bitstream of geometry information.

At Step S322, the attribute information decoding section 322 decodes a bitstream of attribute information.

At Step S323, the invisible processing section 323 determines whether or not to perform invisible processing. In a case where there is a point provided with an invisible attribute, and it is determined to perform invisible processing on the point, the process moves on to Step S324.

At Step S324, the invisible processing section 323 performs invisible processing on the point provided with the invisible attribute.

When the process at Step S324 has been finished, the bitstream decoding process ends, and the process returns to FIG. 19. Furthermore, at Step S323, in a case where it is determined not to perform invisible processing, the process at Step S324 is omitted, and the bitstream decoding process ends, and then the process returns to FIG. 19.

By performing the processes in the way as described above, the decoding device 300 becomes able to realize the suppression of reduction in the subjective image quality of a point cloud.

4. Third Embodiment

<Setting of Multiple Pieces of Attribute Information>

It is to be noted that in the above, it is described that a single piece of attribute information is set on one point; however, the setting of attribute information is not limited to this, and multiple pieces of attribute information may be able to be set on one point.

Figure 21:
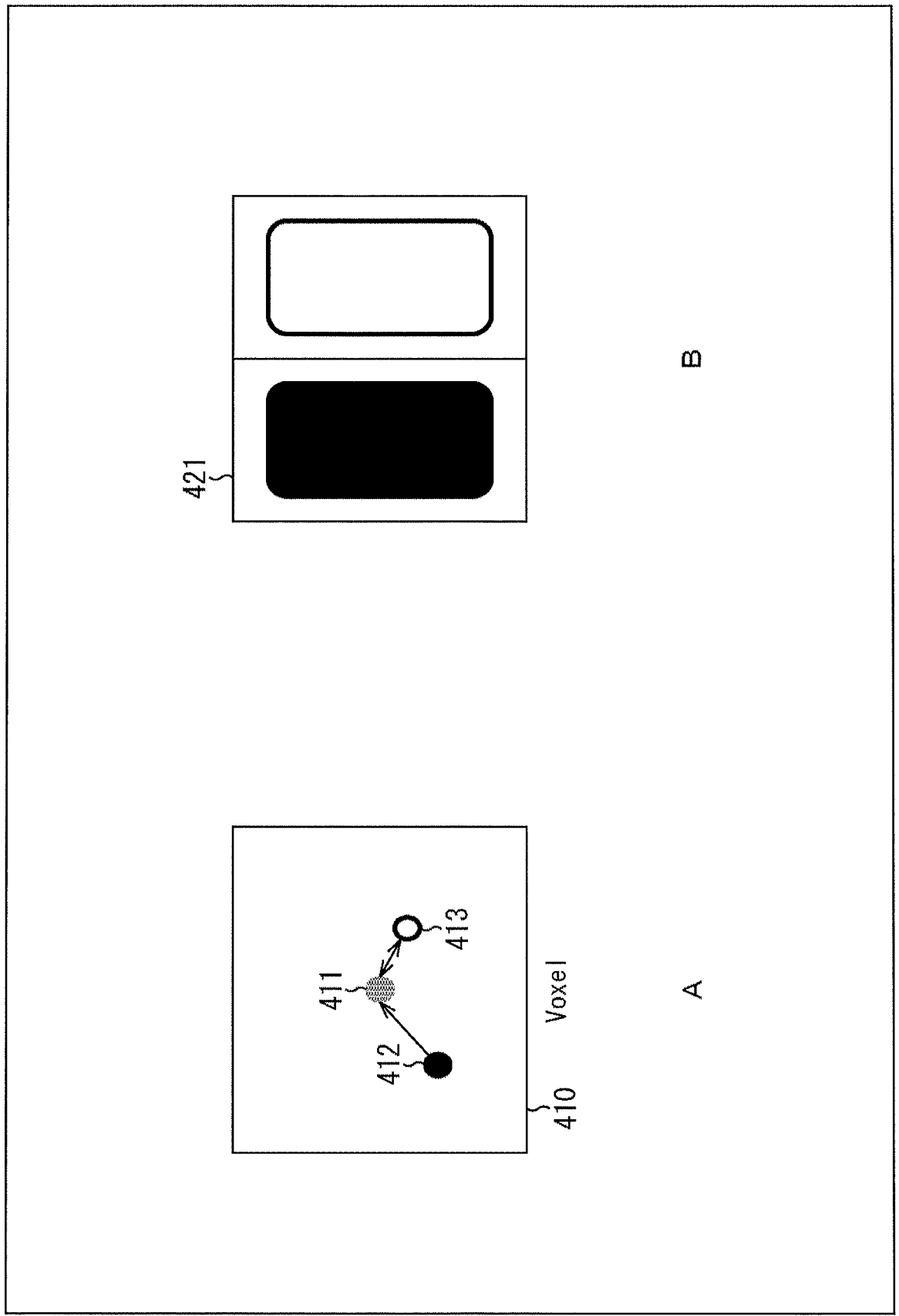
FIG. 21 is a diagram that describes an example of how multiple pieces of attribute information are set.

For example, as illustrated in part A of FIG. 21, in a case where in a voxel 410, points 412 and 413 are set, as points to be compared, for a point 411 that is a current point, respective pieces of attribute information of the both points 412 and 413 may be able to be set on the point 411.

In that case, the respective pieces of attribute information may be set on different directions viewed from the current point as illustrated by attribute information 421 in part B of FIG. 21. In other words, applied attribute information may be changed depending on a direction of accessing the current point (a point-of-view direction).

Furthermore, a direction of applying pieces of attribute information (i.e., a direction of switching the attribute information applied) may be able to be specified. Moreover, the number of pieces of attribute information (for example, the number of colors) settable on the current point may be able to be specified. For example, as illustrated in FIG. 22, information (num_of_color_attribute) indicating the number of pieces of attribute information settable on the current point and information (arrangement_type) indicating a direction (the axis) of switching the attribute information applied may be set.

Figure 22:
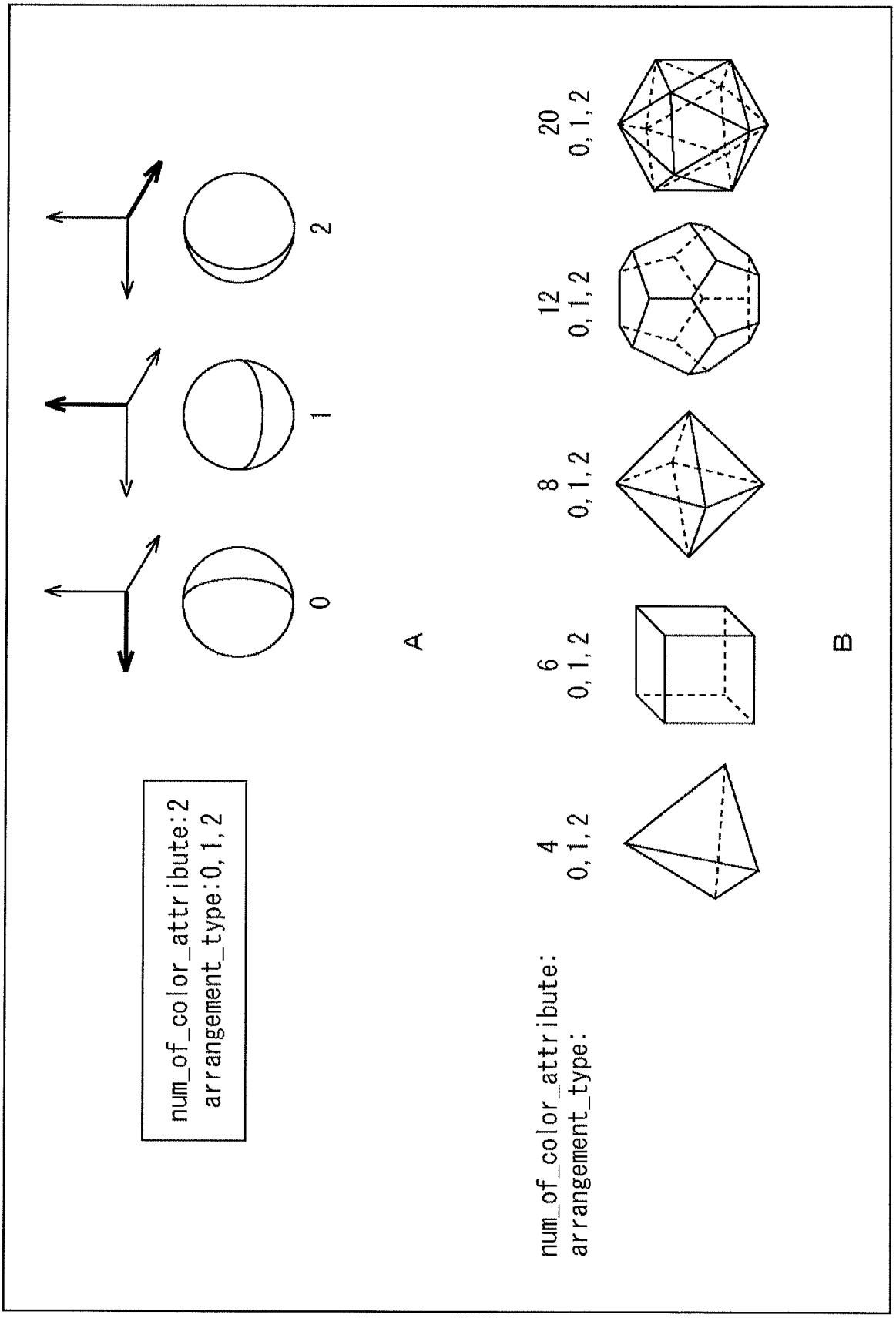
FIG. 22 is a diagram that describes an example of how to assign attribute information.

Part A of FIG. 22 illustrates an example of a case where two pieces of attribute information are set on a current point. As illustrated in part A of FIG. 22, even if the number of pieces of attribute information is the same, a direction to which attribute information is assigned changes depending on a value of arrangement_type.

Part B of FIG. 22 illustrates an example of a case where more pieces of attribute information are set on a current point. As illustrated in part B of FIG. 22, the number of pieces of attribute information set on the current point changes depending on a value of num_of_color_attribute. Then, a direction to which each piece of attribute information is assigned also changes depending on the number of pieces of attribute information.

It is to be noted that attribute information may be switched at a boundary; furthermore, near the boundary, pieces of attribute information on both sides of the boundary may be mixed (blended). For example, in a case of color information, color may be gradually changed as the point-of-view direction changes.

Figure 23:
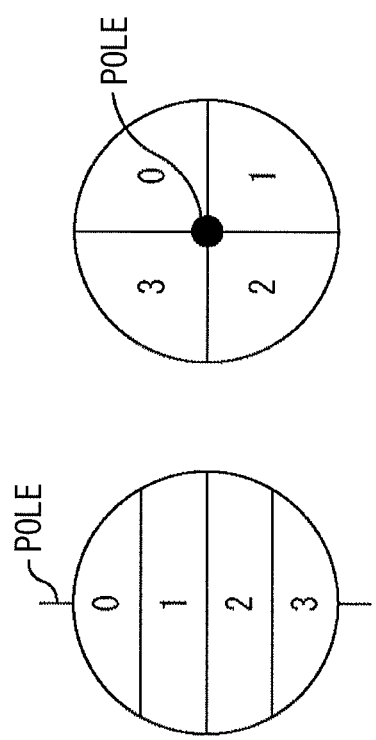
FIG. 23 is a diagram that describes an example of how to assign attribute information.

It is to be noted that any method may be used as a method of dividing the direction to which attribute information is assigned, and the method is not limited to the above-described example. For example, as illustrated in FIG. 23, it may be divided into a direction of the latitude and a direction of the longitude. That is, as a direction to which attribute information is assigned, information (num_of_color_attribute_split_latitude (n_lat)) indicating the number of divisions in the direction of the latitude and information (num_of_color_attribute_split_longitude (n_long)) indicating the number of divisions in the direction of the longitude may be set.

Part A of FIG. 23 illustrates an example of division in the direction of the latitude. Part B of FIG. 23 illustrates an example of division in the direction of the longitude. The number of divisions in the direction of the latitude and the number of divisions in the direction of the longitude may be able to be set independently of each other. Furthermore, for example, as illustrated by a table in part C of FIG. 23, identification information (#) to set respective values of these two parameters together may be provided. By using such identification information, it becomes possible to reduce the amount of information required to indicate the direction to which attribute information is assigned.

Figure 24:
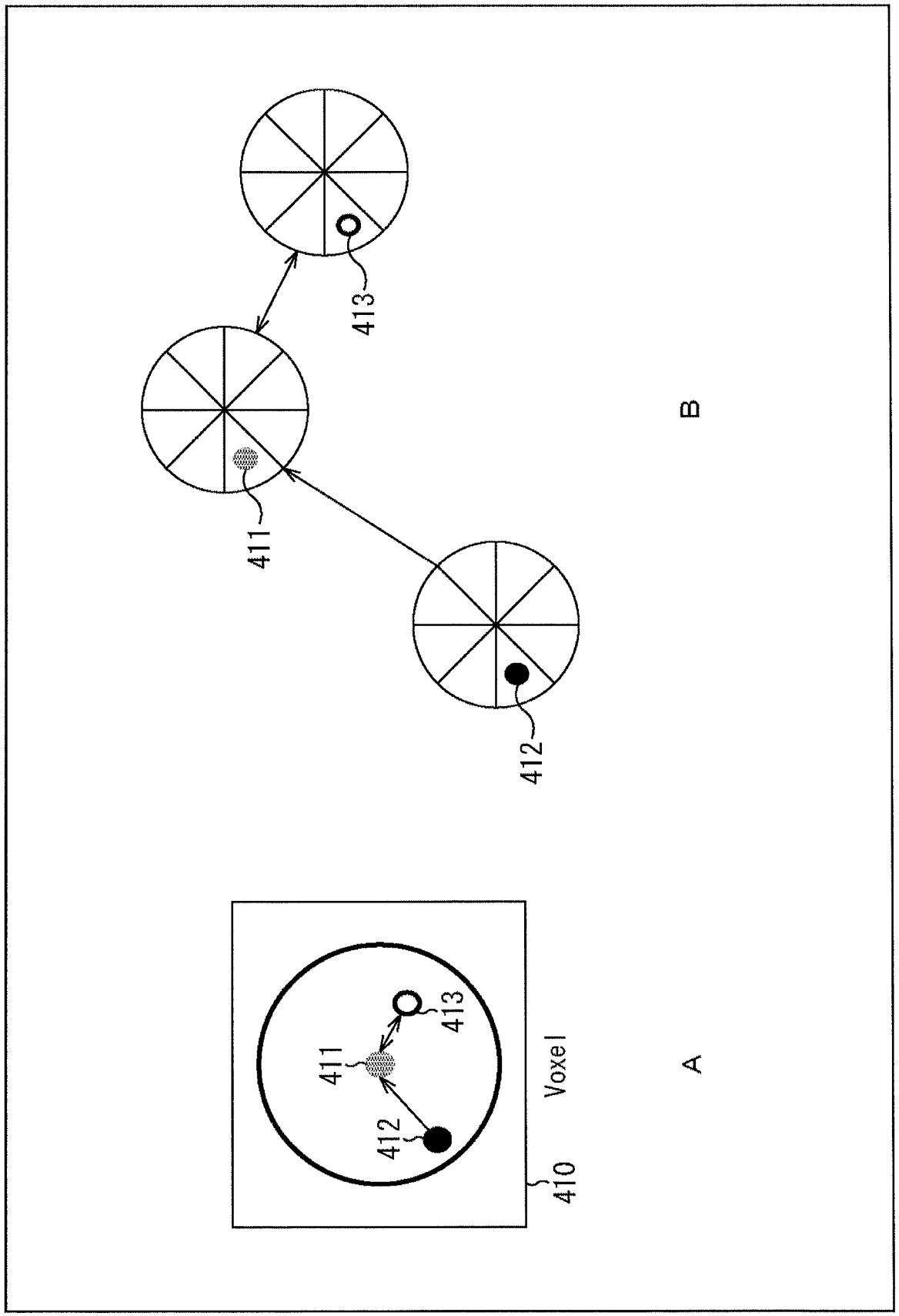
FIG. 24 is a diagram that describes an example of how to set attribute information.

It is to be noted that in a case of setting multiple pieces of attribute information, the attribute information may be assigned to each direction of a current point to which attribute information is able to be assigned in a similar way to the above-described case where one piece of attribute information is assigned. For example, as illustrated in part A of FIG. 24, in a case where in the voxel 410, respective pieces of attribute information of the points 412 and 413 are assigned to the point 411 that is a current point, the points 412 and 413 taking the point 411 as a reference are located in different positions. Therefore, in this case, the attribute information of the point 412 may be assigned to a direction of the point 411 on the side of the point 412 in a similar way to the above-described case where one piece of attribute information is assigned; and the attribute information of the point 413 may be assigned to a direction of the point 411 on the side of the point 413 in a similar way to the above-described case where one piece of attribute information is assigned.

<Flow of Attribute Information Updating Process>

Therefore, in that case, the attribute information updating section 202 has a similar configuration to the case of FIG. 8.

Figure 25:
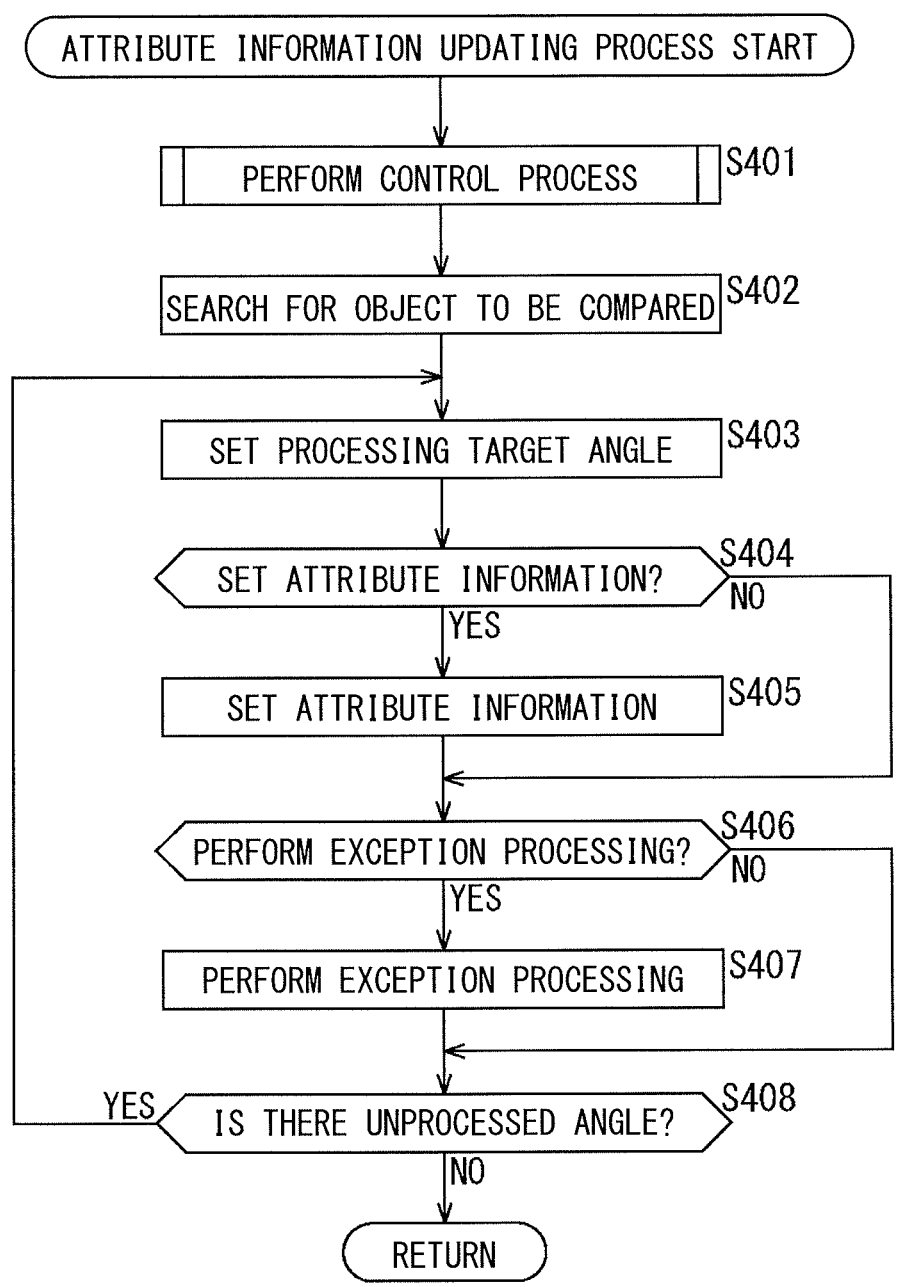
FIG. 25 is a flowchart that describes an example of a flow of an attribute information updating process.

An example of the flow of an attribute information updating process in this case is described with reference to a flowchart illustrated in FIG. 25.

When the attribute information updating process starts, at Step S401, the controller 211 performs a control process, and determines a method for each process. This control process is similar to the case of FIG. 14, and thus, its description is omitted.

At Step S402, the object-to-be-compared search section 221 searches for a point to be compared in accordance with an object-to-be-compared determining method set at Step S401.

At Step S403, the controller 211 sets a processing target angle, i.e., a direction of a current point on which attribute information is set (a current direction).

At Step S404, the attribute information setting section 222 determines whether or not to set attribute information on the current direction of the current point. In a case where it is determined to set attribute information, the process moves on to Step S405.

At Step S405, the attribute information setting section 222 sets attribute information on the current direction of the current point in accordance with a comparison method and an attribute determining method set at Step S401.

When the process at Step S405 has been finished, the process moves on to Step S406. Furthermore, at Step S404, for example, in a case where there is no point to be compared found on the current direction, and it is determined not to set attribute information on that direction, the process moves on to Step S406.

At Step S406, the exception processing section 223 determines whether or not to perform exception processing. For example, in a case where there is no point to be compared found on the current direction, and it is determined to perform exception processing, the process moves on to Step S407.

At Step S407, the exception processing section 223 performs exception processing in accordance with an exception processing method set at Step S401.

When the process at Step S407 has been finished, the process moves on to Step S408. Furthermore, at Step S406, for example, in a case where there is a point to be compared found on the current direction, and it is determined not to perform exception processing, the process at Step S407 is omitted, and the process moves on to Step S408.

At Step S408, the controller 211 determines whether or not there is an unprocessed angle. In a case where it is determined that there is an unprocessed angle, the process moves back to Step S403. At Step S403, the unprocessed angle is set as a processing target (the current direction is updated), and the processes at Step S404 onward are repeated.

In the way described above, the processes at Steps 403 to 408 are performed on each direction of the current point on which attribute information is able to be set.

Then, at Step S408, in a case where it is determined that the process has been performed with respect to all the directions, the attribute information updating process ends, and the process returns to FIG. 13.

By performing the attribute information updating process in the way described above, the encoding device 100 becomes able to suppress the reduction in the subjective image quality of the point cloud.

5. Fourth Embodiment

<Display Device>

In a case of displaying a point cloud including a point with multiple pieces of attribute information set thereon, attribute information used for the display is selected in accordance with its point-of-view direction.

Figure 26:
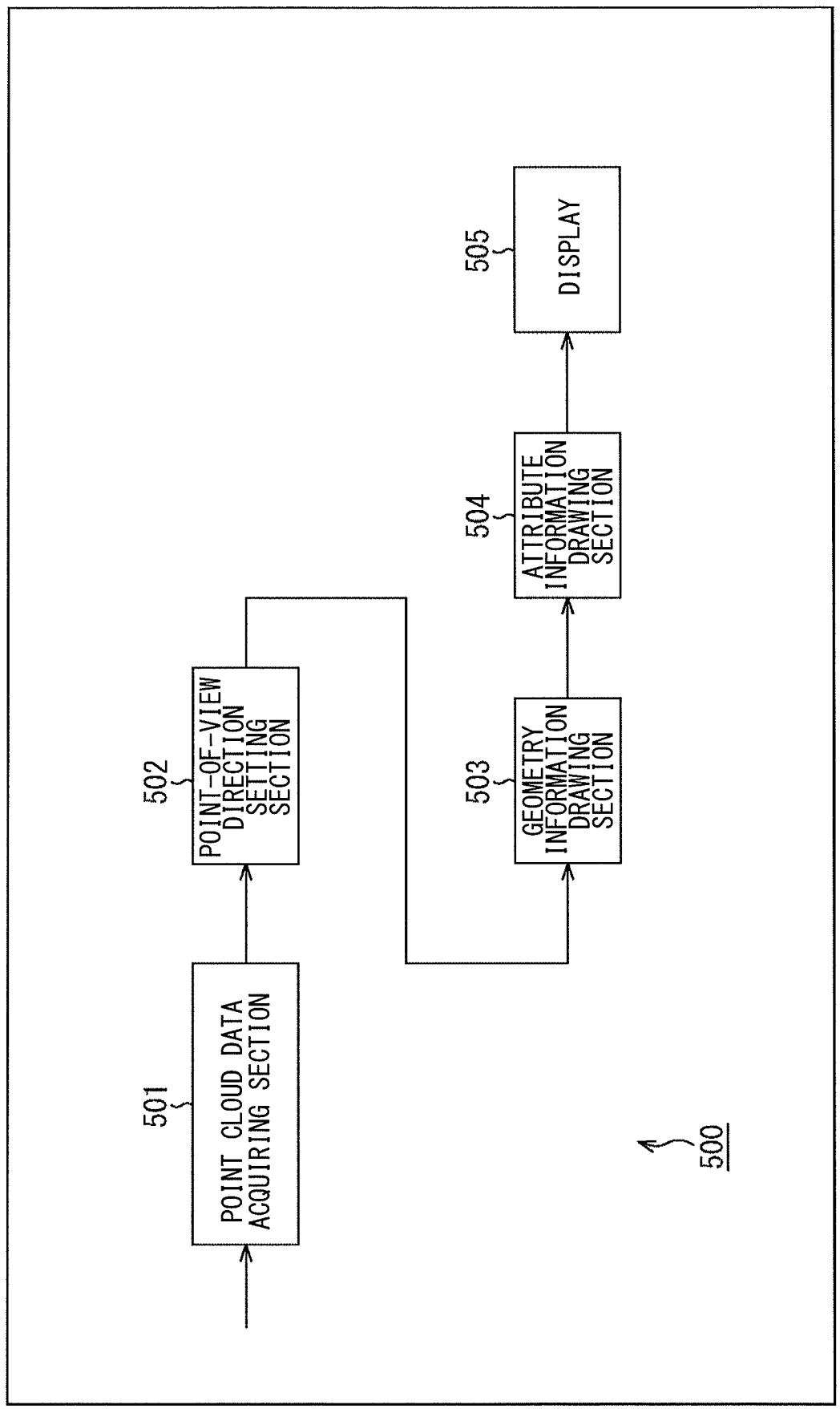
FIG. 26 is a block diagram illustrating an example of a main configuration of a display device.

FIG. 26 is a block diagram illustrating an example of a main configuration of a display device that is an embodiment of the information processing apparatus to which the present technology is applied. A display device 500 illustrated in FIG. 26 is a device that displays thereon a point cloud including a point with multiple pieces of attribute information set thereon.

As illustrated in FIG. 26, the display device 500 includes a point cloud data acquiring section 501, a point-of-view direction setting section 502, a geometry information drawing section 503, an attribute information drawing section 504, and a display 505.

The point cloud data acquiring section 501 acquires point cloud data including a point with multiple pieces of attribute information set thereon from the outside of the display device 500. The point cloud data acquiring section 501 supplies the acquired point cloud data to the point-of-view direction setting section 502.

It is to be noted that the point cloud data acquiring section 501 may have any configuration; for example, the point cloud data acquiring section 501 may include a CPU, a ROM, a RAM, etc., and the CPU may load a program and data that have been stored in the ROM or the like into the RAM and execute the program, thereby performing a process associated with acquisition of point cloud data.

The point-of-view direction setting section 502 sets a plane (a point-of-view direction) on which a point cloud is displayed. For example, the point-of-view direction setting section 502 receives an input of an instruction from the outside, such as a user operation, and sets a point-of-view direction on the basis of the instruction. It is to be noted that any method may be used as a method of setting this point-of-view direction; for example, a point-of-view direction may be set on the basis of something other than the above-described instruction input in such a way that the point-of-view direction setting section 502 sets a point-of-view direction in accordance with a predetermined, specified pattern. When having set the point-of-view direction, the point-of-view direction setting section 502 supplies the point cloud data and information indicating the point-of-view direction of the point cloud data to the geometry information drawing section 503.

It is to be noted that the point-of-view direction setting section 502 may have any configuration; for example, the point-of-view direction setting section 502 may include a CPU, a ROM, a RAM, etc., and the CPU may load a program and data that have been stored in the ROM or the like into the RAM and execute the program, thereby performing a process associated with setting of a point-of-view direction.

The geometry information drawing section 503 draws geometry information of the point cloud data on the basis of the set point-of-view direction. The geometry information drawing section 503 supplies the point cloud data, the information indicating the point-of-view direction of the point cloud data, and a result of the drawing to the attribute information drawing section 504.

It is to be noted that the geometry information drawing section 503 may have any configuration; for example, the geometry information drawing section 503 may include a CPU, a ROM, a RAM, etc., and the CPU may load a program and data that have been stored in the ROM or the like into the RAM and execute the program, thereby performing a process associated with drawing of geometry information.

The attribute information drawing section 504 selects attribute information of each point on the basis of the set point-of-view, and draws the selected attribute information. The attribute information drawing section 504 supplies a result of the drawing of the geometry information and the attribute information to the display 505.

It is to be noted that the attribute information drawing section 504 may have any configuration; for example, the attribute information drawing section 504 may include a CPU, a ROM, a RAM, etc., and the CPU may load a program and data that have been stored in the ROM or the like into the RAM and execute the program, thereby performing a process associated with drawing of attribute information.

The display 505 displays the supplied result of the drawing of the geometry information and the attribute information on a monitor.

<Flow of Display Process>

Figure 27:
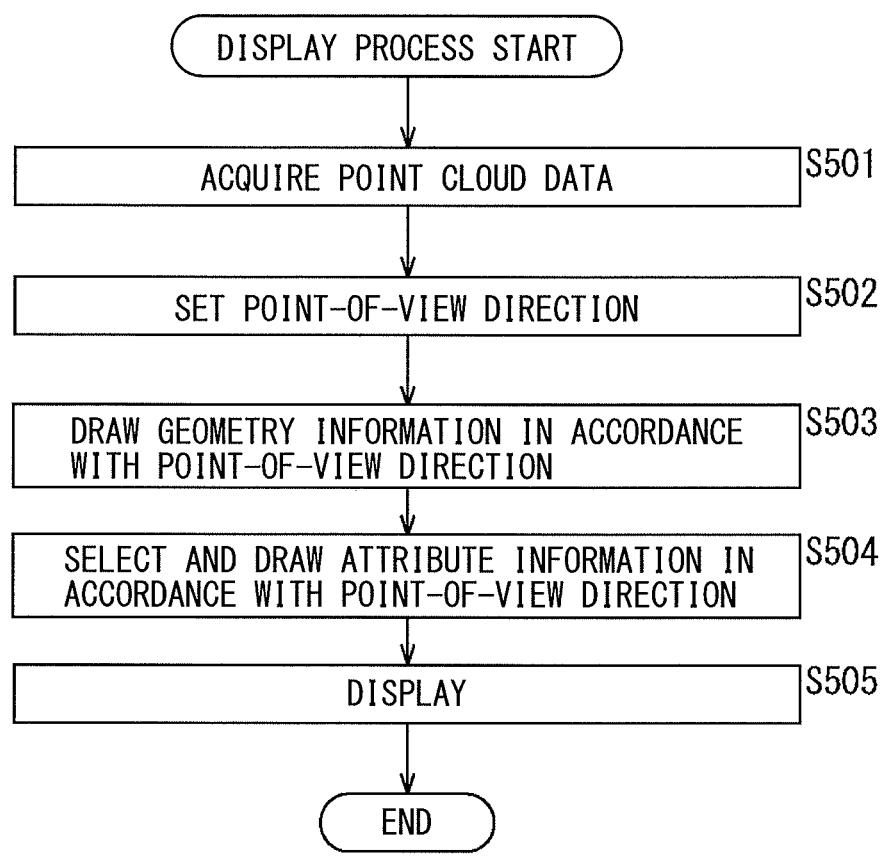
FIG. 27 is a flowchart that describes an example of a flow of a display process.

An example of the flow of a display process performed by such a display device 500 is described with reference to a flowchart illustrated in FIG. 27.

When the display process starts, at Step S502, the point cloud data acquiring section 501 acquires point cloud data.

At Step S502, the point-of-view direction setting section 502 sets a point-of-view direction on which a point cloud is displayed.

At Step S503, the geometry information drawing section 503 draws geometry information of the point cloud data in accordance with the point-of-view direction set at Step S502.

At Step S504, the attribute information drawing section 504 selects attribute information in accordance with the point-of-view direction set at Step S502, and draws the selected attribute information.

At Step S505, the display 505 displays an image of the geometry information and the attribute information drawn at Steps S503 and S504.

When the process at Step S505 has been finished, the display process ends. It is to be noted that in a case where a point cloud is displayed as a moving image, the above processes are repeated with respect to each frame.

By doing so, the display device 500 becomes able to cause attribute information depending on a point-of-view direction to be displayed. For example, it is also possible to cause a color of each point to change depending on a direction of viewing point cloud data (a point-of-view direction).

6. Fifth Embodiment

<Image Processing Apparatus>

In the above, encoding (quantization) of point cloud data is described; however, it is possible to apply the update of attribute information to which the present technology is applied to any image processing that changes position information of a point cloud.

Figure 28:
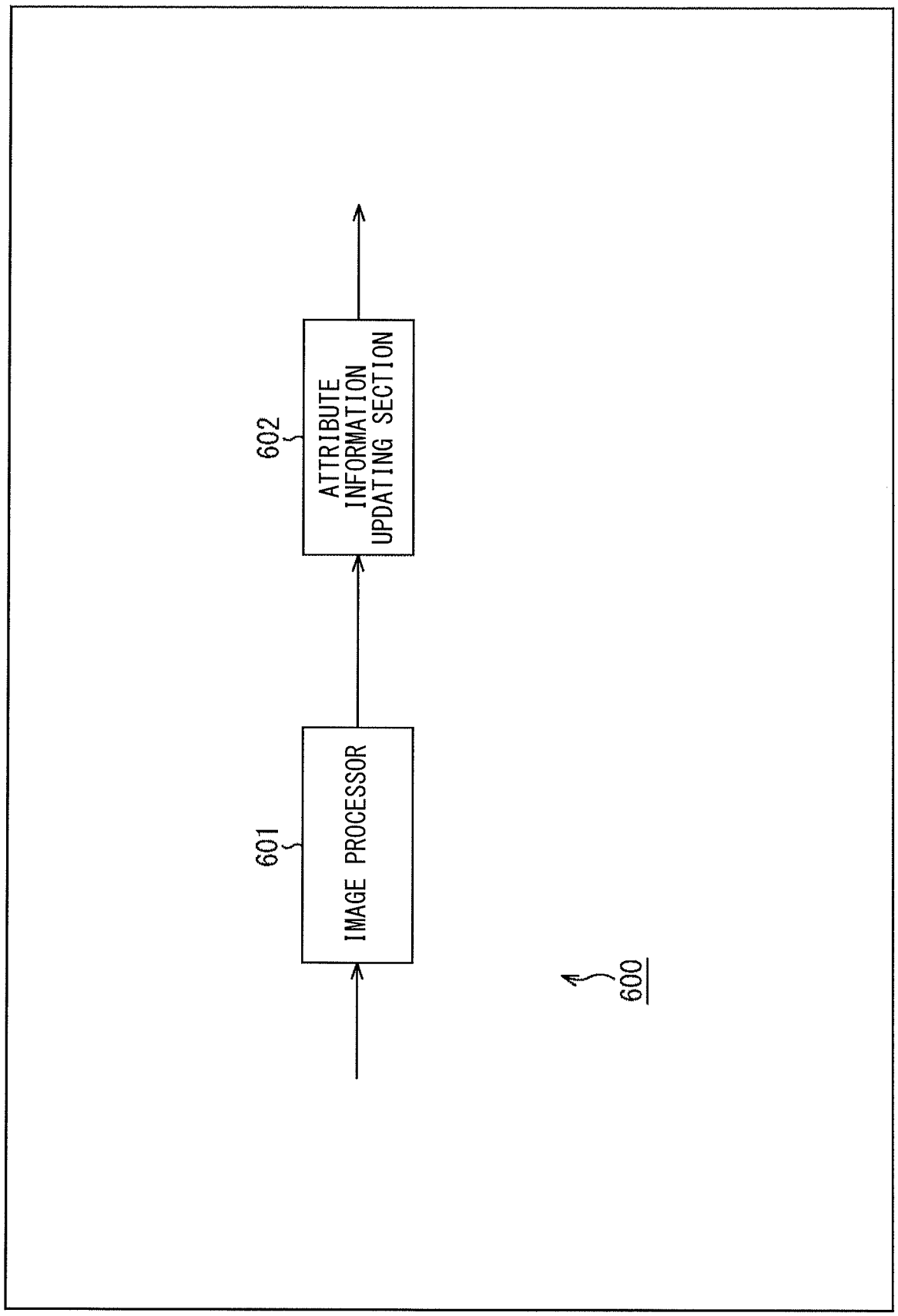
FIG. 28 is a block diagram illustrating an example of a main configuration of an image processing apparatus.

FIG. 28 is a block diagram illustrating an example of a main configuration of an image processing apparatus that is an embodiment of the information processing apparatus to which the present technology is applied. An image processing apparatus 600 illustrated in FIG. 28 is an apparatus that performs predetermined image processing, which changes position information, on inputted point cloud data.

As illustrated in FIG. 28, the image processing apparatus 600 includes an image processor 601 and an attribute information updating section 602.

Figure 29:
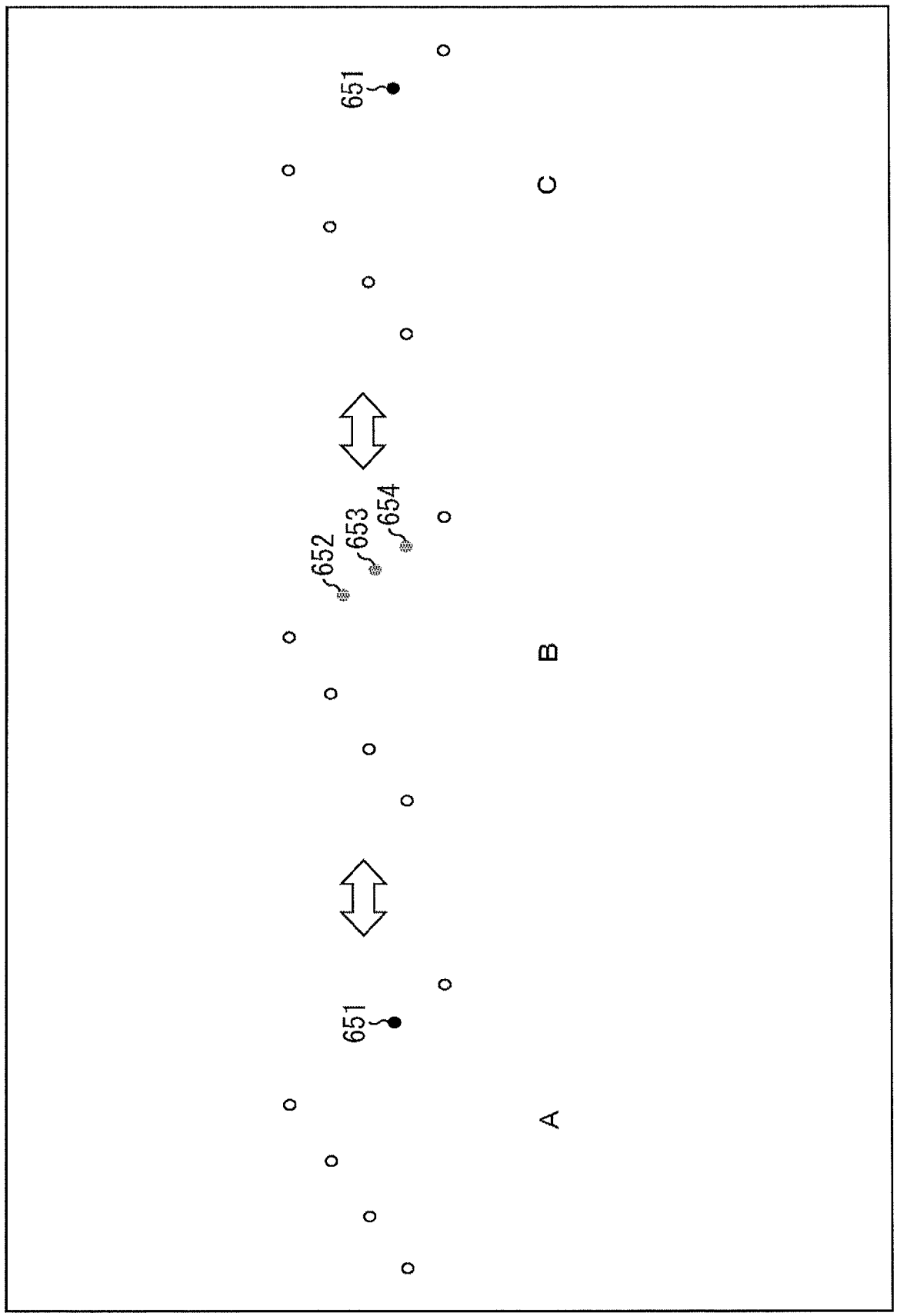
FIG. 29 is a diagram that describes an example of interpolation and resampling of points.

The image processor 601 performs predetermined image processing. For example, as illustrated by an example of FIG. 29, the image processor 601 performs interpolation and resampling (replacement) of points. In a case of the example of FIG. 29, a point 651 in state A before processing is resampled and converted into points 652 to 654 in state B after processing. That is, the number of points is increased.

The image processor 601 supplies the pieces of point cloud data before and after processing to the attribute information updating section 602.

It is to be noted that the image processor 601 may have any configuration; for example, the image processor 601 may include a CPU, a ROM, a RAM, etc., and the CPU may load a program and data that have been stored in the ROM or the like into the RAM and execute the program, thereby performing a process associated with image processing.

The attribute information updating section 602 updates attribute information using the supplied point cloud data before and after image processing. The attribute information updating section 602 has a similar configuration to the attribute information updating section 202 (FIG. 8), and performs a similar process.

Even in a process to place a point that did not exist before processing in this way, the attribute information updating section 602 searches points before the processing for a point to be compared corresponding to a current point, and therefore is able to update attribute information in accordance with change in position information, as with the above-described case of quantization.

<Flow of Image Processing>

Figure 30:
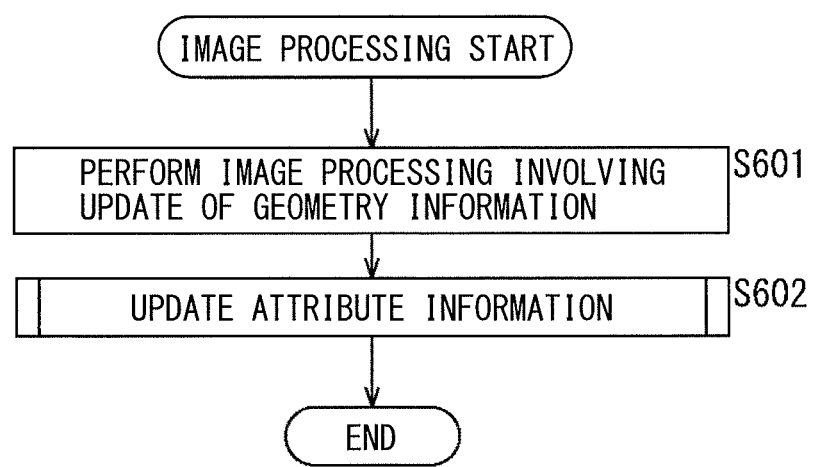
FIG. 30 is a flowchart that describes an example of a flow of image processing.

An example of the flow of image processing performed by this image processing apparatus 600 is described with reference to a flowchart illustrated in FIG. 30.

When the image processing starts, at Step S601, the image processor 601 performs image processing involving update of geometry information.

At Step S602, the attribute information updating section 602 updates attribute information of a point cloud to correspond to the update of geometry information (change in position information) in the image processing at Step S601. This attribute information updating process is performed with the flow similar to the case described with reference to the flowchart of FIG. 14, and thus, its description is omitted.

When the process at Step S602 has been finished, the image processing ends.

As described above, the image processing apparatus 600 is able to suppress the reduction in the subjective image quality of the point cloud.

7. Others

<Software>

It may be configured to cause hardware to perform the above-described series of processing or to cause software to perform them. Furthermore, it may be configured to cause hardware to perform some of the processing and software to perform the other processing. In a case where the series of processing is performed by software, a program included in the software is installed in a computer. The computer here includes a computer built into dedicated hardware and a computer, for example, such as a general-purpose personal computer that is able to execute various functions by installing various programs.

Figure 31:
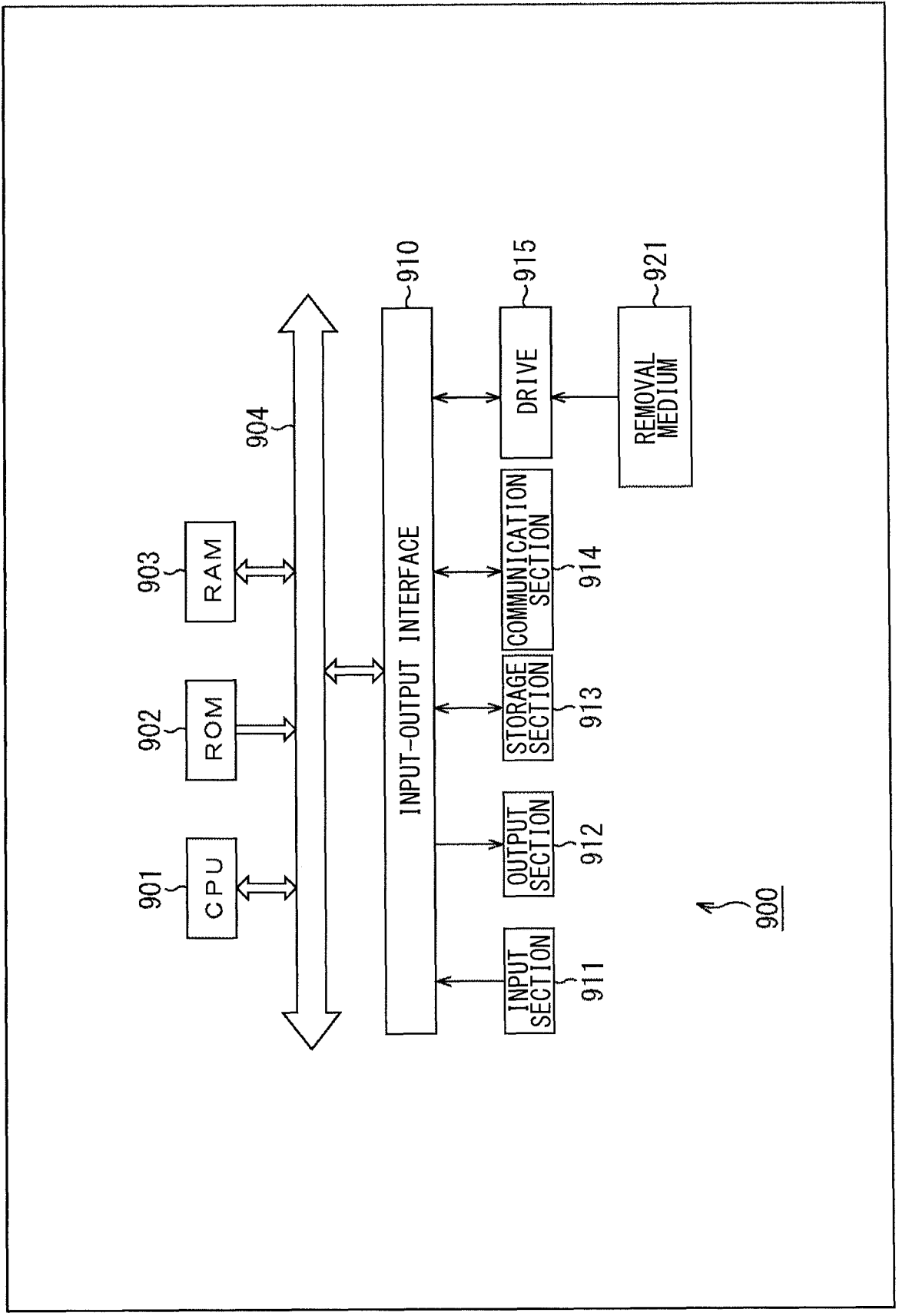
FIG. 31 is a block diagram illustrating an example of a main configuration of a computer.

FIG. 31 is a block diagram illustrating a configuration example of hardware of a computer that executes a program, thereby performing the above-described series of processing.

In a computer 900 illustrated in FIG. 31, a central processing unit (CPU) 901, a read-only memory (ROM) 902, and a random access memory (RAM) 903 are coupled to one another by a bus 904.

An input-output interface 910 is also coupled to the bus 904. An input section 911, an output section 912, a storage section 913, a communication section 914, and a drive 915 are coupled to the input-output interface 910.

The input section 911 includes, for example, a keyboard, a mouse, a microphone, a touch panel, an input terminal, etc. The output section 912 includes, for example, a display, a speaker, an output terminal, etc. The storage section 913 includes, for example, a hard disk, a RAM disk, anonvolatile memory, etc. The communication section 914 includes, for example, a network interface. The drive 915 drives a removal medium 921, such as a magnetic disk, an optical disc, a magneto-optical disk, a semiconductor memory, or the like.

In the computer configured as above, for example, the CPU 901 loads a program stored in the storage section 913 into the RAM 903 through the input-output interface 910 and the bus 904, and executes the program, thereby performing the above-described series of processing. In the RAM 903, data, etc. required for the CPU 901 to perform various processing are stored appropriately.

The program executed by the computer 900 (the CPU 901) may be used, for example, by recording the program on the removal medium 921 as a package medium or the like. In that case, the removal medium 921 is set in the drive 915, thereby the program is able to be installed in the storage section 913 through the input-output interface 910. Furthermore, this program may be provided through a wired or wireless transmission medium, such as a local area network, the Internet, or digital satellite broadcasting. In that case, the program is able to be received by the communication section 914 and installed in the storage section 913. Besides, this program may be pre-installed in the ROM 902 or the storage section 913.

<Supplementary Note>

Embodiments of the present technology are not limited to the foregoing embodiments, and may be modified in a variety of ways without departing from the scope of the present technology.

For example, the present technology may be implemented as any structure included in an apparatus or a system, for example, such as a processor provided as a system large-scale integration (LSI) or the like, a module using multiple processors, etc., a unit using multiple modules, etc., or a set that is a unit added with other functions (i.e., a structure of part of an apparatus).

It is to be noted that in the present specification, a system means an assembly of multiple components (such as apparatuses or modules (parts)), regardless of whether or not all the components are in the same enclosure. Therefore, multiple apparatuses that are housed in separate enclosures and are coupled to one another through a network and one apparatus in which multiple modules are housed in one enclosure are both a system.

Furthermore, the above-described processing sections may be realized by any structure as long as they have their corresponding functions described above. For example, the processing sections may include any circuit, an LSI, a system LSI, a processor, a module, a unit, a set, a device, an apparatus, a system, or the like. Alternatively, some of these may be combined. For example, structures of the same type, such as multiple circuits or multiple processors, may be combined, or structures of different types, such as a circuit and an LSI, may be combined.

Moreover, for example, a structure described as one apparatus (or processing section) may be divided into multiple apparatuses (or processing sections). Conversely, structures described as multiple apparatuses (or processing sections) may be combined into one apparatus (or processing section). Furthermore, naturally, a structure other than those described above may be added to the configuration of each apparatus (or each processing section). Moreover, if they are substantially the same in the configuration and the operation as an entire system, some structures of one apparatus (or processing section) may be included in the configuration of another apparatus (or another processing section).

Furthermore, for example, the present technology may have a configuration of cloud computing that allows multiple apparatuses to share one function through a network and perform processing in cooperation.

Moreover, for example, the above-described program may be executed in any apparatus. In that case, the apparatus only has to have a function (such as a function block) required and be able to obtain necessary information.

Furthermore, for example, each of respective steps of the above-described flowcharts may be performed by one apparatus, or may be shared and performed by multiple apparatuses. Moreover, in a case where one step includes multiple processes, the multiple processes included in the one step may be performed by one apparatus, or may be shared and performed by multiple apparatuses. In other words, the multiple processes included in the one step may be performed as multiple steps. Conversely, processes described as multiple steps may be combined and performed as one step.

The program executed by the computer may be executed in chronological order in accordance with the order in which respective processes at steps written in the program are described in the present specification, or may be executed in parallel or individually at required timing, such as when a call is issued. That is, unless it causes a contradiction, the respective processes at the steps may be performed in the order different from the above-described order. Furthermore, the respective processes at the steps written in this program may be performed in parallel with processes of another program, or may be performed in combination with processes of another program.

Several examples of the present technology described in the present specification may each be implemented independently alone. Needless to say, any of the several examples of the present technology may be implemented in combination as well. For example, a portion or all of the present technology described in any of the embodiments may be implemented in combination with a portion or all of the present technology described in another embodiment. Furthermore, a portion or all of any of the above-described examples of the present technology may be implemented in combination with another technology not described above.

It is to be noted that the present technology may have the following configurations.

(1)

An information processing apparatus including:

a search section that searches point cloud data before update of position information for a point to be compared, the point to be compared being a point to be compared with a current point, the current point being a processing target point of the point cloud data with the updated position information; and an attribute information setting section that compares the point to be compared retrieved by the search section with the current point, and sets attribute information of the current point.

(2)

The information processing apparatus according to (1), in which the search section selects, in the point cloud data before the update of the position information, a point located nearest to the current point as the point to be compared.

(3)

The information processing apparatus according to (1) or (2), in which the search section selects, in the point cloud data before the update of the position information, a point that is located at a distance shorter than a predetermined distance and is located nearest to the current point as the point to be compared.

(4)

The information processing apparatus according to any of (1) to (3), in which the search section selects, in the point cloud data before the update of the position information, a point that is selected in accordance with another algorithm and is located at a distance shorter than a predetermined distance to the current point as the point to be compared.

(5)

The information processing apparatus according to any of (1) to (4), in which the attribute information setting section sets the attribute information on the basis of a positional relationship between points on a direction from the point cloud data before the update of the position information to the point cloud data with the updated position information.

(6)

The information processing apparatus according to any of (1) to (5), in which the attribute information setting section sets the attribute information on the basis of a positional relationship between points on a direction from the point cloud data with the updated position information to the point cloud data before the update of the position information.

(7)

The information processing apparatus according to any of (1) to (6), in which the attribute information setting section sets the attribute information on the basis of a positional relationship between points on both the direction from the point cloud data before the update of the position information to the point cloud data with the updated position information and the direction from the point cloud data with the updated position information to the point cloud data before the update of the position information.

(8)

The information processing apparatus according to any of (1) to (7), in which the attribute information setting section selects any one of respective pieces of attribute information of a plurality of the points to be compared retrieved by the search section, and sets attribute information of the current point.

(9)

The information processing apparatus according to any of (1) to (8), in which the attribute information setting section sets, as attribute information of the current point, an average of respective pieces of attribute information of a plurality of the points to be compared retrieved by the search section.

(10)

The information processing apparatus according to any of (1) to (9), in which the attribute information setting section sets, as attribute information of the current point, a weighted average of respective pieces of attribute information of a plurality of the points to be compared retrieved by the search section.

(11)

The information processing apparatus according to (10), in which the weight is a coefficient based on a distance between the point to be compared and the current point or a feature of attribute information of the point to be compared.

(12)

The information processing apparatus according to any of (1) to (11), further including an exception processing section that performs predetermined exception processing in a case where there is no point to be compared.

(13)

The information processing apparatus according to (12), in which the exception processing section sets, as attribute information of the current point, an invisible attribute that causes the current point to be invisible.

(14)

The information processing apparatus according to (12) or (13), in which the exception processing section excludes the current point from objects to be encoded, and causes re-encoding to be performed.

(15)

The information processing apparatus according to any one of (12) to (14), in which the exception processing section causes re-encoding to be performed by a different encoding method that causes the current point to disappear.

(16)

The information processing apparatus according to any one of (1) to (15), further including a controller that controls an attribute information determining method, in which the attribute information setting section sets attribute information of the current point using an attribute information determining method selected by the controller.

(17)

The information processing apparatus according to (16), in which the controller controls the attribute information determining method on the basis of at least one of processing speed, quality, or a compression algorithm.

(18)

The information processing apparatus according to (16) or (17), in which the controller further controls a comparison method of comparing the current point with the point to be compared, and the attribute information setting section compares the current point with the point to be compared using a comparison method selected by the controller.

(19)

The information processing apparatus according to any of (16) to (18), in which the controller controls a determining method of determining the point to be compared, and the search section determines the point to be compared using a determining method selected by the controller.

(20)

The information processing apparatus according to any of (16) to (19), further including an exception processing section that performs predetermined exception processing in a case where there is no point to be compared, in which the controller controls a method of the exception processing, and the exception processing section performs exception processing selected by the controller.

(21)

The information processing apparatus according to any of (1) to (20), in which the attribute information setting section sets a plurality of pieces of attribute information on the current point.

(22)

The information processing apparatus according to (21), in which the attribute information setting section sets the plurality of pieces of attribute information on different directions viewed from the current point.

(23)

The information processing apparatus according to (22), in which the attribute information setting section sets information indicating the number of pieces of attribute information settable on the current point and information indicating a direction of switching attribute information.

(24)

The information processing apparatus according to (22) or (23), in which the attribute information setting section sets, as a direction to which the attribute information is assigned, information indicating the number of divisions in a direction of the latitude and the number of divisions in a direction of the longitude.

(25)

The information processing apparatus according to any of (1) to (24), in which the point cloud data with the updated position information is voxel data that is quantized point cloud data.

(26)

The information processing apparatus according to any of (1) to (25), in which the attribute information includes at least any one of color information, an $\alpha$ channel, or a normal vector.

(27)

An information processing method including:

searching point cloud data before update of position information for a point to be compared, the point to be compared being a point to be compared with a current point, the current point being a processing target point of the point cloud data with the updated position information; and comparing the retrieved point to be compared with the current point and setting attribute information of the current point.

REFERENCE SIGNS LIST 100 encoding device
101 controller
111 preprocessing section
112 bounding box setting section
113 voxel setting section
114 signal stream generator
115 encoder
201 geometry information encoding section
202 attribute information updating section
203 attribute information encoding section
204 synthesizer
221 object-to-be-compared search section
222 attribute information setting section
223 exception processing section
231 comparison method setting section
232 object-to-be-compared determining method setting section
233 attribute determining method setting section
234 exception processing method setting section
300 decoding device
301 decoder
302 voxel data generator 303 point cloud reconstructing section
321 geometry information decoding section
322 attribute information decoding section
323 invisible processing section
500 display device
501 point cloud data acquiring section
502 point-of-view direction setting section
503 geometry information drawing section
504 attribute information drawing section
505 display
600 image processing apparatus
601 image processor
602 attribute information updating section
900 computer

The invention claimed is:

1. An information processing apparatus comprising:
circuitry configured to
search point cloud data for a point to be compared,
update position information of the point cloud data after searching the point cloud data,
compare, after updating the position information of the point cloud data, the point to be compared with a current point of the point cloud data,
set attribute information of the current point based on an attribute of the point to be compared, and
set, as a direction to which the attribute information is assigned, information indicating a number of divisions in a direction of latitude and a number of divisions in a direction of longitude,
wherein the direction is a direction viewed from the current point.

2. The information processing apparatus according to claim 1, wherein the circuitry is further configured to select, in the point cloud data before the update of the position information, a point located nearest to the current point as the point to be compared.

3. The information processing apparatus according to claim 1, wherein the circuitry is further configured to select, in the point cloud data before the update of the position information, a point that is located at a distance shorter than a predetermined distance and is located nearest to the current point as the point to be compared.

4. The information processing apparatus according to claim 1, wherein the circuitry is further configured to select, a point that is located within a predetermined distance from the current point on a basis of an algorithm to reduce an error of a structure caused due to the updating of the positional information of the point cloud data.

5. The information processing apparatus according to claim 1, wherein the circuitry is further configured to set the attribute information on a basis of a positional relationship between points on a direction from the point cloud data before the update of the position information to the point cloud data with the updated position information or a positional relationship between points on a direction from the point cloud data with the updated position information to the point cloud data before the update of the position information.

6. The information processing apparatus according to claim 1, wherein the circuitry is further configured to set the attribute information on a basis of a positional relationship between points on both a direction from the point cloud data before the update of the position information to the point cloud data with the updated position information and a direction from the point cloud data with the updated position information to the point cloud data before the update of the position information.

7. The information processing apparatus according to claim 1, wherein the circuitry is further configured to
select any one of respective pieces of attribute information of a plurality of the points to be compared, and
set the attribute information of the current point.

8. The information processing apparatus according to claim 1, wherein the circuitry is further configured to set, as the attribute information of the current point, an average of respective pieces of attribute information of a plurality of the points to be compared.

9. The information processing apparatus according to claim 1, wherein the circuitry is further configured to set, as the attribute information of the current point, a weight as a weighted average of respective pieces of attribute information of a plurality of the points to be compared.

10. The information processing apparatus according to claim 9, wherein the weight is a coefficient based on a distance between the point to be compared and the current point or a feature of attribute information of the point to be compared.

11. The information processing apparatus according to claim 1, wherein the circuitry is further configured to perform predetermined exception processing in a case where there is no point to be compared.

12. The information processing apparatus according to claim 1, wherein the circuitry is further configured to
control an attribute information determining method, and
set the attribute information of the current point using the attribute information determining method.

13. The information processing apparatus according to claim 12, wherein the circuitry is further configured to control the attribute information determining method on a basis of at least one of processing speed, quality, or a compression algorithm.

14. The information processing apparatus according to claim 1, wherein the circuitry is further configured to set a plurality of pieces of attribute information on the current point.

15. The information processing apparatus according to claim 14, wherein the circuitry is further configured to set the plurality of pieces of attribute information on different directions viewed from the current point.

16. The information processing apparatus according to claim 1, wherein the point cloud data with the updated position information is voxel data that is quantized point cloud data.

17. The information processing apparatus according to claim 1, wherein the attribute information includes at least any one of color information, an α channel, or a normal vector.

18. An information processing apparatus comprising:
circuitry configured to
search point cloud data for a point to be compared,
update position information of the point cloud data after searching the point cloud data,
compare, after updating the position information of the point cloud data, the point to be compared with a current point of the point cloud data,
set attribute information of the current point based on an attribute of the point to be compared, the attribute information of the current point including
information indicating a number of pieces of attribute information, and
information indicating an arrangement of the point to be compared with respect to the current point.

19. The information processing apparatus according to claim 18, wherein the number of pieces of attribute information is more than one piece of attribute information.

20. An information processing method comprising:
searching point cloud data for a point to be compared;
updating position information of the point cloud data after searching the point cloud data;
comparing, after updating the position information of the point cloud data, the point to be compared with a current point of the point cloud data;
setting attribute information of the current point based on an attribute of the pointed to be compared; and
setting, as a direction to which the attribute information is assigned, information indicating a number of divisions in a direction of latitude and a number of divisions in a direction of longitude,
wherein the direction is a direction viewed from the current point.

21. An information processing method comprising:
searching point cloud data for a point to be compared;
updating position information of the point cloud data after searching the point cloud data;
comparing, after updating the position information of the point cloud data, the point to be compared with a current point of the point cloud data; and
setting attribute information of the current point based on an attribute of the point to be compared, the attribute information of the current point including
information indicating a number of pieces of attribute information, and
information indicating an arrangement of the point to be compared with respect to the current point.

22. The information processing method according to claim 21, wherein the number of pieces of attribute information is more than one piece of attribute information.

* * * * *